US010547535B2

(12) United States Patent
Yamada

(10) Patent No.: US 10,547,535 B2
(45) Date of Patent: Jan. 28, 2020

(54) RELAY DEVICE, DISPLAY DEVICE, CONNECTION INFORMATION TRANSMISSION METHOD, AND NETWORK CONFIGURATION DISPLAY METHOD

(71) Applicant: Mitsubishi Electric Corporation, Tokyo (JP)

(72) Inventor: Isamu Yamada, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/316,249

(22) PCT Filed: Dec. 22, 2016

(86) PCT No.: PCT/JP2016/088311
§ 371 (c)(1),
(2) Date: Jan. 8, 2019

(87) PCT Pub. No.: WO2018/116435
PCT Pub. Date: Jun. 28, 2018

(65) Prior Publication Data
US 2019/0166038 A1    May 30, 2019

(51) Int. Cl.
*H04L 12/28* (2006.01)
*H04L 12/715* (2013.01)
(Continued)

(52) U.S. Cl.
CPC .............. *H04L 45/04* (2013.01); *G06F 13/00* (2013.01); *H04L 12/66* (2013.01); *H04L 41/044* (2013.01);
(Continued)

(58) Field of Classification Search
CPC ....... H04L 45/04; H04L 41/12; H04L 41/044; H04L 41/065; G06F 13/00
(Continued)

(56) References Cited

U.S. PATENT DOCUMENTS

2002/0194417 A1* 12/2002 Suzuki .............. H04L 12/40052
710/305
2006/0020729 A1* 1/2006 Nakamura ........ H04L 12/40058
710/113
2015/0127733 A1* 5/2015 Ding ....................... H04W 4/08
709/204

FOREIGN PATENT DOCUMENTS

JP    H06-075612 A    3/1994
JP    H06-350609 A    12/1994
(Continued)

OTHER PUBLICATIONS

International Search Report dated Mar. 21, 2017 for PCT/JP2016/088311 filed on Dec. 22, 2016, 9 pages including english translation.
Decision to Grant a Patent received for Japanese Patent Application No. 2017-559900, dated Jul. 10, 2018, 5 pages including english translation.
(Continued)

*Primary Examiner* — John Pezzlo
(74) *Attorney, Agent, or Firm* — Xsensus LLP

(57) ABSTRACT

A relay device is connected to two networks of a plurality of layered networks and connected to a first communication device directly under a first lower layer network that is on a lower level of the two networks. The relay device includes a storage unit that stores connection information including model identification information associated with each of a second communication device and the first communication device and information on the number of connected second communication devices or on a memory area assigned to each of the first communication device and the second communication device, the second communication device being connected to a lower side through a second lower layer network that is situated lower than the first lower layer network, the connection information being arranged in a format capable of specifying a layer of a network to which each communication device is connected.

14 Claims, 17 Drawing Sheets

(51) Int. Cl.
  *H04L 12/24* (2006.01)
  *H04L 12/66* (2006.01)
  *G06F 13/00* (2006.01)
  *H04J 1/16* (2006.01)

(52) U.S. Cl.
  CPC ........ *H04L 41/065* (2013.01); *H04L 41/0853* (2013.01); *H04L 41/12* (2013.01); *H04L 41/22* (2013.01)

(58) Field of Classification Search
  USPC .............................. 370/252, 238, 254, 329
  See application file for complete search history.

(56) References Cited

FOREIGN PATENT DOCUMENTS

| | | | |
|---|---|---|---|
| JP | 2001-320393 | A | 11/2001 |
| JP | 2004-159259 | A | 6/2004 |
| JP | 2009-266047 | A | 11/2009 |
| JP | 2010-213101 | A | 9/2010 |
| JP | 5619303 | B2 | 9/2014 |
| WO | 2010-104153 | A1 | 9/2010 |
| WO | 2014/010009 | A1 | 1/2014 |

OTHER PUBLICATIONS

Chinese Office Action dated Oct. 21, 2019 in Chinese Application No. 201680988529.0.

* cited by examiner

FIG.9
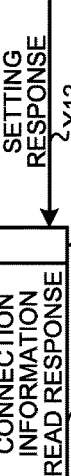
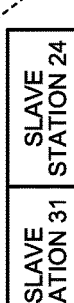
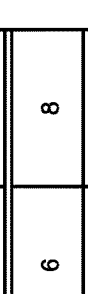
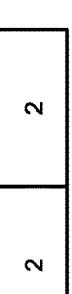

| CONNECTION INFORMATION OF BRIDGE STATION 11 62 | L11 | L12 | L30 | L31 | L24 |
|---|---|---|---|---|---|
| COMMUNICA-TION DEVICE | BRIDGE STATION 11 | BRIDGE STATION 12 | SLAVE STATION 30 | SLAVE STATION 31 | SLAVE STATION 24 |
| HEAD ADDRESS | 0 | 2 | 4 | 6 | 8 |
| NUMBER OF POINTS OF USE | 10 | 6 | 2 | 2 | 2 |

RELAY DEVICE, DISPLAY DEVICE, CONNECTION INFORMATION TRANSMISSION METHOD, AND NETWORK CONFIGURATION DISPLAY METHOD

CROSS-REFERENCE TO RELATED APPLICATIONS

This application is a National Stage Application based on PCT/JP2016/088311, filed on 22 Dec. 2016, the entire contents of which being incorporated herein by reference.

FIELD

The present invention relates to a relay device, a display device, a connection information transmission method, and a network configuration display method that are used in a communication system in which a master station and a slave station communicate with one another.

BACKGROUND

Conventionally, in a factory automation (FA) network for automating a production process in a factory, a master station receives a request from a control system design support device, thereupon polls slave stations to collect device types, identification information, and the like of the slave stations, and generates network connection information that is configuration information of the slave stations connected to the FA network to transmit the network connection information to the control system design support device (Patent Literatures 1 and 2).

CITATION LIST

Patent Literature

Patent Literature 1: Japanese Patent No. 5619303
Patent Literature 2: Japanese Patent Application Laid-open No. 2009-266047

SUMMARY

Technical Problem

However, the FA network according to the above conventional technique has a single-layer network configuration. For this reason, in a case where the network configuration of an FA network is composed of two or more layers, the master station cannot recognize which slave station is connected to which layer, that is, what is the connection relation between networks, and so cannot generate network connection information covering two or more layers. This situation has been problematic for a long time.

The present invention has been made in view of the above circumstances, and an object thereof is to provide a relay device capable of recognizing the connection relation between communication devices in a network for each layer in a case where the network configuration is composed of two or more layers.

Solution to Problem

In order to solve the above-mentioned problems and achieve the object, the present invention is directed to a relay device connected to two networks of a plurality of hierarchized networks and connected to a first communication device directly under a first lower layer network that is on a lower level of the two networks. The relay device comprises a storage unit to store connection information including model identification information associated with each of a second communication device and the first communication device and information on the number of connected second communication devices or on a memory area assigned to each of the first communication device and the second communication device, the second communication device being connected to a lower side through a second lower layer network that is situated lower than the first lower layer network, the connection information being arranged in a format capable of specifying a network layer to which each communication device is connected.

Advantageous Effects of Invention

A relay device according to the present invention can achieve an advantageous effect of recognizing the connection relation between communication devices in a network for each layer in a case where the network configuration is composed of two or more layers.

BRIEF DESCRIPTION OF DRAWINGS

FIG. 9 is a sequence diagram illustrating a process of correcting the cause of an error in a case where the error is caused when a control system design support device of a communication system according to a second embodiment acquires connection information stored in a bridge station.

DESCRIPTION OF EMBODIMENTS

Hereinafter, a relay device, a display device, a connection information transmission method, and a network configuration display method according to embodiments of the present invention will be described in detail with reference to the drawings. The present invention is not necessarily limited by these embodiments.

First Embodiment

Figure 1:
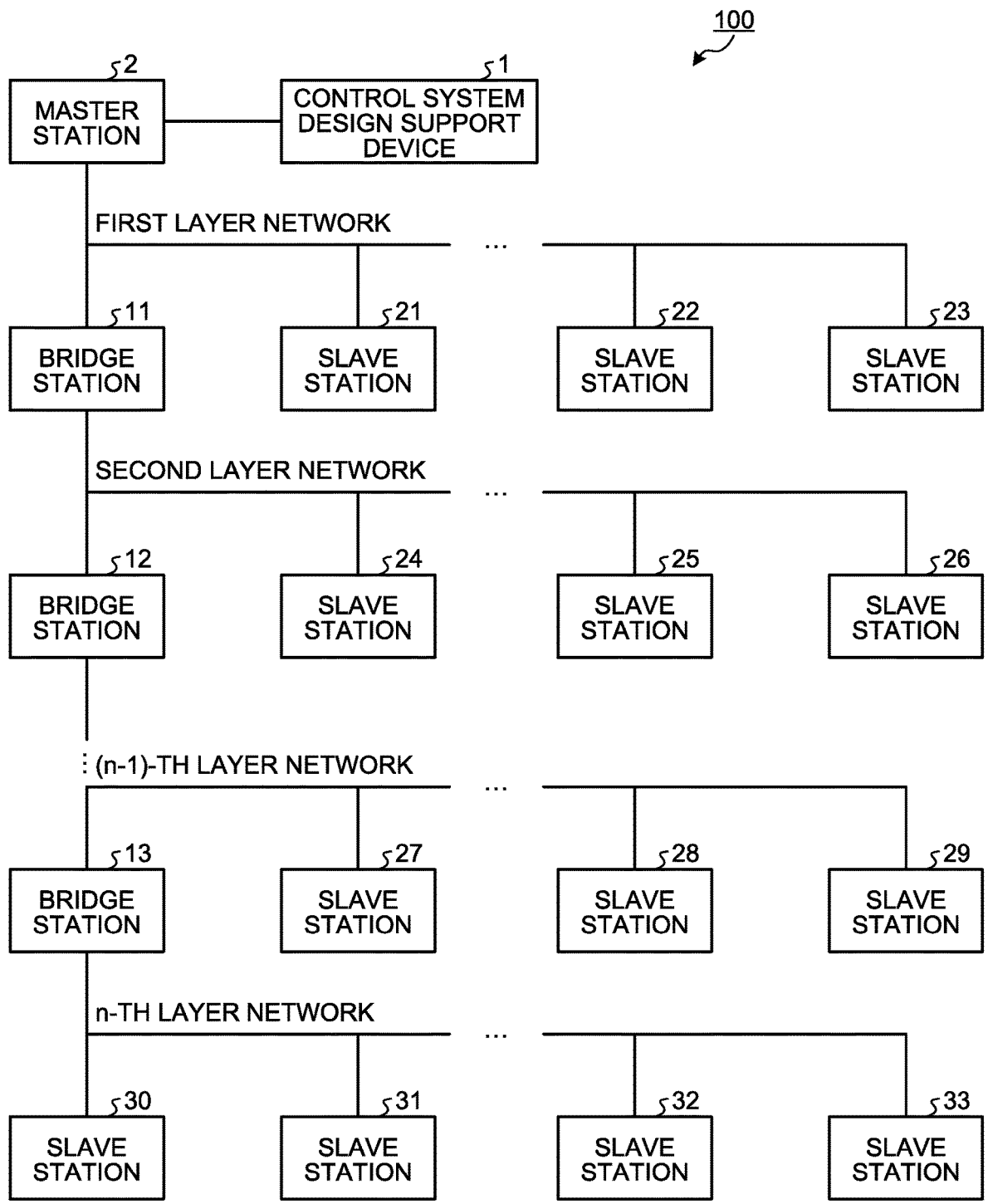
FIG. 1 is a diagram illustrating an exemplary configuration of a communication system according to a first embodiment.

FIG. 1 is a diagram illustrating an exemplary configuration of a communication system 100 according to the first embodiment of the present invention. The communication system 100 includes a control system design support device 1, a master station 2, bridge stations 11 to 13, and slave stations 21 to 33. The communication system 100 is a system that enables communication devices to communicate with one another using addresses of one shared memory assigned to the communication devices of a number of layers, or a number of networks which are hierarchized. In the present embodiment, a bridge station is installed between two layered networks to be connected. Networks connected through a bridge station are differently layered networks even though they have their respective equal configurations. FIG. 1 illustrates an example in which the communication system 100 is configured by networks on n layers. Note that n is an integer of two or more. With regard to the n-th layer network, the larger the value of n, the lower the layer of the network. The communication system 100 is, for example, a system constituting an FA network.

The control system design support device 1 helps a user to perform settings and the like for communication devices constituting the communication system 100, namely, the master station 2, the bridge stations 11 to 13, and the slave stations 21 to 33. The control system design support device 1 is also a display device that displays the network configuration of the communication system 100. The control system design support device 1 is, for example, a personal computer.

The master station 2 is a communication device having a single shared memory on the networks used in the communication system 100 and having a function of managing the shared memory. Each communication device is assigned with an address or addresses of the shared memory. Each communication device can communicate with other communication devices using the address assigned to the communication device. As a specific example, each of the slave stations 21 to 33 is connected to a controlled device (not illustrated) and captures an input from the controlled instrument. The controlled instrument is exemplified by a sensor. Each of the slave stations 21 to 33 is exemplified by a remote input/output (I/O) interface for capturing an input from a sensor at set intervals. Each of the slave stations 21 to 33 captures an input from a sensor at intervals designated by the master station 2. Upon capturing an input from a sensor, each of the slave stations 21 to 33 writes the captured input value in the shared memory assigned to the slave station. As a result, the master station 2 having the shared memory holds input values from all the controlled devices controlled by the slave stations 21 to 33. It should be noted that each of the bridge stations 11 to 13 writes information on an operation of the bridge station in the shared memory assigned to the bridge station. Such information on the operation may be, for example, error information in the event of an error. Assigning an address to each communication device in the master station 2 means designating a memory address to which an input from the controlled device connected to each communication device is to be stored. Further, managing the shared memory by the master station 2 means that the master station 2 can determine in which address area an input value from which controlled device connected to which communication device is stored. It should be noted that the shared memory used in the present embodiment is similar to that used in a conventional network or the like including a plurality of communication devices.

Each of the bridge stations 11 to 13 is a communication device connected to two of the plurality of layered networks and having a function of relaying signals between the networks on the two layers. The bridge stations 11 to 13 also function as relay devices. As a specific example, the bridge stations 11 to 13 are exemplified by gateways or repeaters. The bridge stations 11 to 13 transfer instructions from the master station 2 to the slave stations 21 to 33 and transfer responses from the slave stations 21 to 33 to the master station 2. With respect to the two networks connected to each of the bridge stations 11 to 13, the lower level network of the two networks may be referred to as the first lower layer network, and the upper level network of the two networks may be referred to as the upper layer network. From the viewpoint of each of the bridge stations 11 to 13, the network just below the first lower layer network of a targeted bridge station may be referred to as the second lower layer network. Each of the bridge stations 11 to 13 is connected to the communication device directly under the first lower layer network. The term "directly under" means that there is no other bridge station in between.

The slave stations 21 to 33 are, for example, communication devices used when controlling each manufacturing device in a case where the communication system 100 is an FA network.

Figure 2:
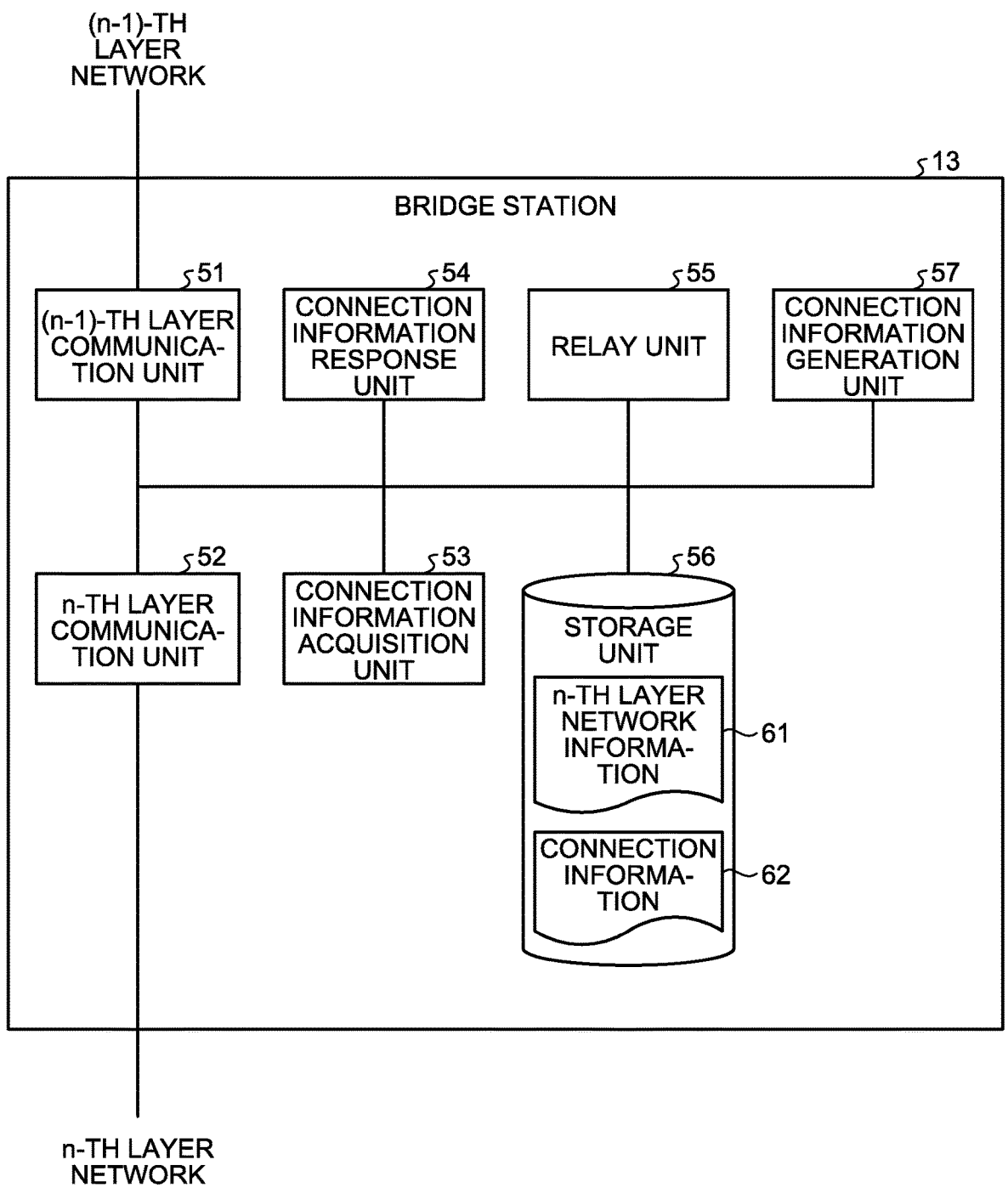
FIG. 2 is a block diagram illustrating an exemplary configuration of a bridge station according to the first embodiment.

The configuration of the bridge stations 11 to 13 will be described. Since the bridge stations 11 to 13 have similar configurations, the bridge station 13 will be described as a representative example. FIG. 2 is a block diagram illustrating an exemplary configuration of the bridge station 13 according to the first embodiment. The bridge station 13 includes an (n−1)-th layer communication unit 51, an n-th layer communication unit 52, a connection information acquisition unit 53, a connection information response unit 54, a relay unit 55, a storage unit 56, and a connection information generation unit 57.

The (n−1)-th layer communication unit 51 controls communication with a communication device connected to the (n−1)-th layer network which is the upper layer network of the two layered networks connected to the bridge station 13.

The n-th layer communication unit 52 controls communication with a communication device connected to the n-th layer network which is the lower layer network of the two layered networks connected to the bridge station 13.

In a case where there is another bridge station as a communication device connected to the n-th layer network, the connection information acquisition unit 53 acquires connection information 62 stored in a storage unit 56 of the other bridge station from the other bridge station.

In response to a connection information read request from the control system design support device 1 via another bridge station connected to the (n−1)-th layer network or the master station 2, the connection information response unit 54 transmits the connection information 62 stored in the storage unit 56 as a response thereupon. A communication device connected to the (n−1)-th layer network may be referred to as a third communication device.

When performing communication using the head address of addresses assigned to the shared memory, based on the head address designated as the destination of a received frame, that is, the logical address, the relay unit 55 relays the frame to the corresponding destination address, that is, the physical address. Specifically, when performing communication using a head address as a destination, that is, a logical address, the relay unit 55 reads the connection information 62 stored in the storage unit 56 to determine a relay destination corresponding to the head address, reads n-th layer network information 61 stored in the storage unit 56 to determine a destination corresponding to the relay destination, that is, a physical address, and relays the frame to the determined destination, that is, the physical address. In this way, when receiving a signal, or a frame, addressed to a head address, the relay unit 55 specifies the slave station to which the signal is addressed or the bridge station that relays the signal based on the connection information 62 stored in the storage unit 56, and transmits the signal to the specified slave station or bridge station.

The storage unit 56 can store information including the n-th layer network information 61 and the connection information 62.

For each communication device which is a first communication device connected to one layered network, that is, the n-th layer network, the n-th layer network information 61 includes information indicating a device unique code, a head address of the memory area of the shared memory to be used, and the number of points of use of the memory area of the shared memory to be used. The device unique code is model identification information for identifying the model of each communication device, herein identifying a bridge station or a slave station. The device unique code may be any information that can specify whether a communication device is a bridge station or a slave station, and for example, may be a physical address assigned to each communication device, a production serial number, or the like. The physical address is, for example, a device-specific media access control (MAC) address. The head address is information indicated by the smallest, that is, lowest, address number of the addresses of the memory area, that is, shared memory, assigned to each communication device. The number of points of use is information indicating the size of the memory area of the addresses of the shared memory assigned to each communication device, that is, a memory size. The head address and the number of points of use may be collectively referred to as information on address. The head address of the memory area and information on the memory size may be collectively referred to as information on memory area. The n-th layer network information 61 is information set in advance when the user constructs the n-th layer network by operation using the control system design support device 1 or by operating a switch (not illustrated) of the bridge station 13. Note that the n-th layer network information 61 may be simply referred to as network information.

In a case where the communication system 100 includes a network on a lower layer than the n-th layer network, the connection information 62 includes information on the device unique code, head address, and number of points of use of the first communication device and a second communication device. In that case, the first communication device is connected to the n-th layer network, and the second communication device is connected to any of the networks ranging from a network on a layer below the first communication device to a network on the lowermost layer that is the lowest layer. When the entire system is regarded as a tree configuration expanding from the master station 2, a part/component closer to the master station 2 is called an upper part/component, and a part/component farther from the master station 2 is called a lower part/component. The second communication device may be within the range of communication devices connected to the (n+1)-th layer network below the first communication device connected to the n-th layer network, that is, within the range of two layers from the bridge station 13. In the connection information 62, information pieces on the communication devices are arranged in a format that can specify the network layers to which the communication devices are connected. The connection information 62 is information generated by the connection information generation unit 57 described later. Therefore, the connection information 62 is not stored in the storage unit 56 in a state before the connection information 62 is generated by the connection information generation unit 57.

The connection information generation unit 57 uses the n-th layer network information 61 stored in the storage unit 56 and the connection information 62 stored in another bridge station connected to the n-th layer and acquired by the connection information acquisition unit 53 to generate the connection information 62 to be stored for the bridge station 13, and causes the storage unit 56 to store the generated connection information 62 therein. From the viewpoint of the bridge station 13, the connection information stored in another bridge station and acquired by the connection information acquisition unit 53 may be referred to as first connection information, and the connection information generated by the bridge station 13 may be referred to as second connection information.

Figure 3:
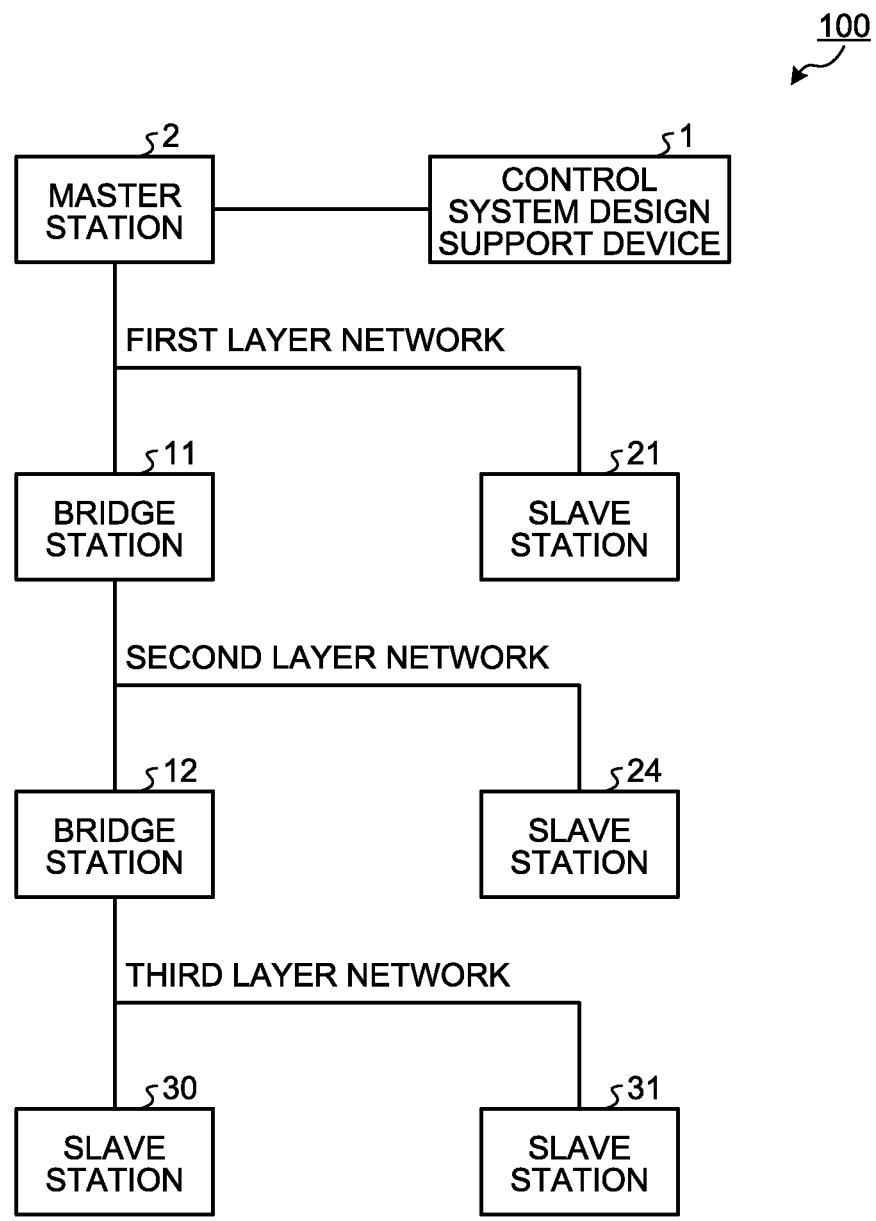
FIG. 3 is a diagram illustrating another exemplary configuration of a communication system according to the first embodiment.

Next, the operation in which the control system design support device 1 of the communication system 100 acquires information on the communication devices connected to the communication system 100 and information on the network configuration will be described. For the sake of simplifying the explanation, the following description is based on the premise that the network configuration of the communication system 100 includes only the first, second, and third layer networks. FIG. 3 is a diagram illustrating another exemplary configuration of the communication system 100 according to the first embodiment. In FIG. 3, the communication system 100 includes the control system design support device 1, the master station 2, the bridge stations 11 and 12, and the slave stations 21, 24, 30, and 31.

Figure 4:
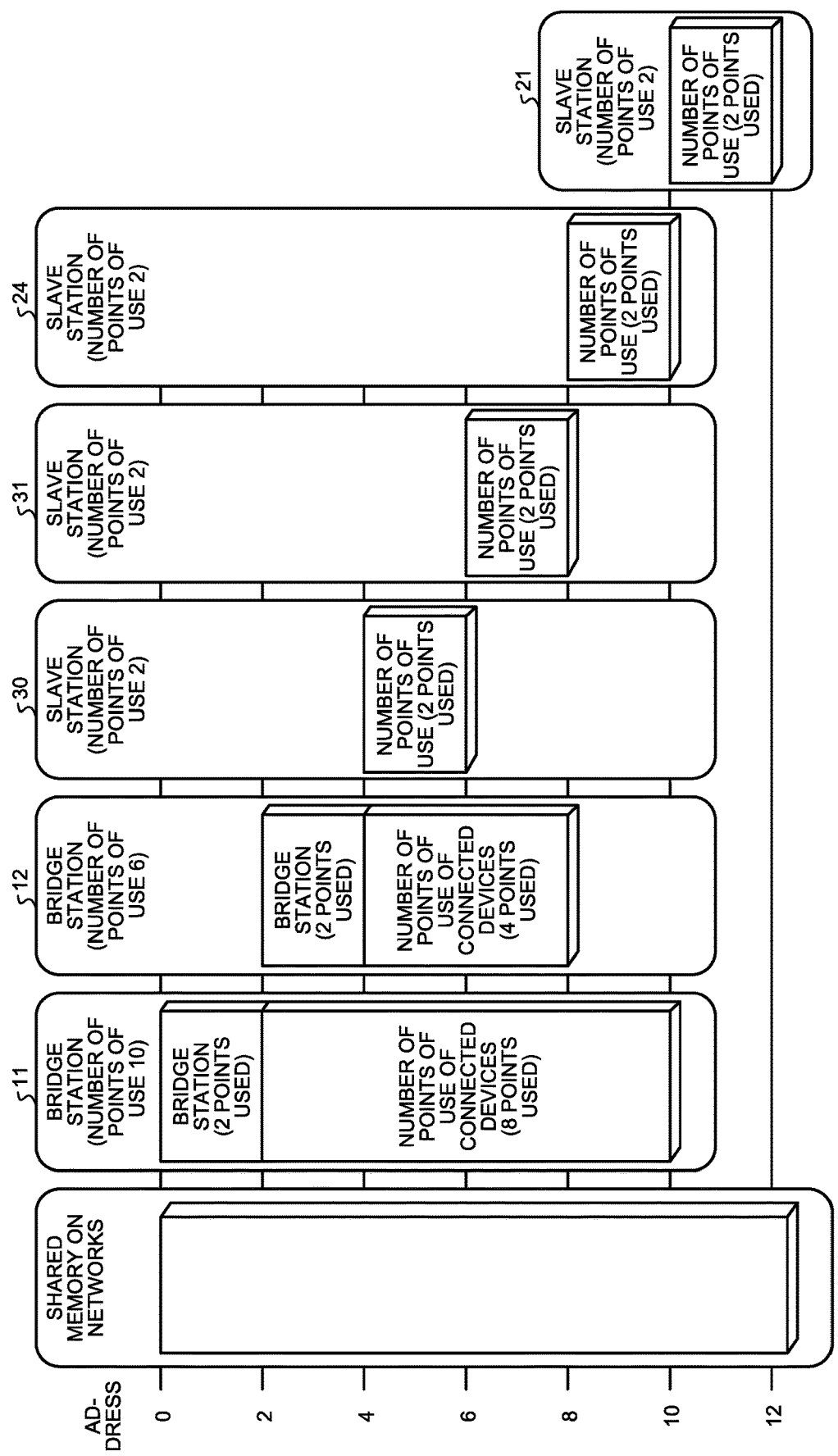
FIG. 4 is a diagram illustrating example addresses of a shared memory on networks assigned to the communication devices of the communication system according to the first embodiment.

With reference to the communication system 100 illustrated in FIG. 3, the address of the shared memory assigned to each communication device of the communication system 100 will be described. FIG. 4 is a diagram illustrating example addresses of the shared memory on the networks assigned to the respective communication devices of the communication system 100 according to the first embodiment. As an address of the shared memory, "the number of points of use" 2 is assigned to each communication device of the communication system 100, that is, each of the bridge stations 11 and 12 and the slave stations 21, 24, 30, and 31. The addresses are assigned to the respective communication devices so as not to overlap each other. Here, the bridge station 12 is assigned with "the number of points of use" 6, which includes the number of points of use of the bridge station 12 itself and the numbers of points of use for the slave stations 30 and 31 that belong to the third layer network connected to the bridge station 12. Similarly, the bridge station 11 is assigned with "the number of points of use" 10, which includes the number of points of use of the bridge station 11 itself, the numbers of points of use for the bridge station 12 and the slave station 24 that belong to the second layer network connected to the bridge station 11, and the numbers of points of use for the slave stations 30 and 31 that belong to the third layer network connected to the bridge station 12. That is, the number of points of use assigned to a bridge station is the sum of the numbers of points of use of all the communication devices that belong to the networks ranging from the network on a layer connected to the bridge station itself to the network on the lowest layer.

Figure 5:
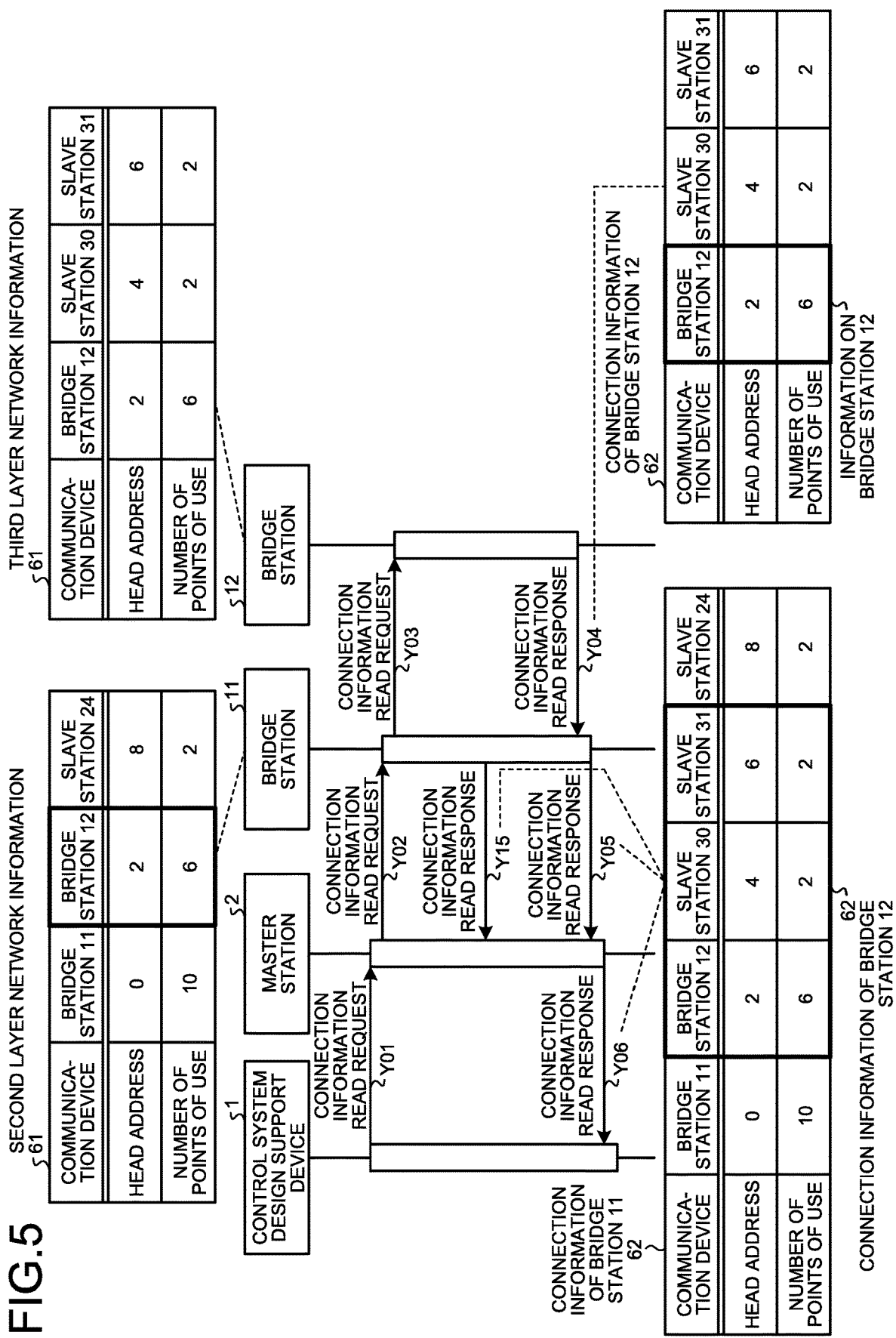
FIG. 5 is a sequence diagram illustrating an example process in which a control system design support device of the communication system according to the first embodiment acquires connection information stored in a bridge station.

FIG. 5 is a sequence diagram illustrating an example process of acquiring the connection information 62 stored in the bridge station 11 by the control system design support device 1 of the communication system 100 according to the first embodiment. In FIG. 5, each item indicated by "communication device" in the second layer network information 61 and the connection information 62 stored in the bridge station 11 and the third layer network information 61 and the connection information 62 stored in the bridge station 12 indicates a communication device specified by the above-described device unique code.

First, the control system design support device 1 transmits, to the master station 2, a connection information read request Y01 addressed to the bridge station 11. Note that the connection information of each communication device included in the first layer network in the communication system 100 has been known to the control system design support device 1. The control system design support device 1 can acquire the connection information of each communication device included in the first layer network by using the conventional method such as the method described in the Background section.

Upon receiving the connection information read request Y01 from the control system design support device 1, the master station 2 determines that the destination of the connection information read request Y01 is the bridge station 11, and transfers the received connection information read request Y01 as a connection information read request Y02 to the bridge station 11.

In the bridge station 11 that has received the connection information read request Y02, the connection information response unit 54 confirms whether or not the connection information 62 is stored in the storage unit 56. If the connection information 62 is stored in the storage unit 56, the connection information response unit 54 transmits, to the master station 2, a connection information read response Y15 addressed to the control system design support device 1 that has transmitted the connection information read request. The connection information read response Y15 is a frame in which the connection information 62 of the bridge station 11 is stored.

If the connection information 62 is not stored in the storage unit 56, the connection information response unit 54 instructs the connection information generation unit 57 to generate the connection information 62. The connection information generation unit 57 refers to the second layer network information 61 stored in the storage unit 56 to confirm whether or not a bridge station is connected to the second layer network. Since the bridge station 12 is connected to the second layer network, the connection information generation unit 57 instructs the connection information acquisition unit 53 to acquire connection information from the bridge station 12. The connection information acquisition unit 53 transmits a connection information read request Y03 to the bridge station 12 connected to the second layer network.

In the bridge station 12 that has received the connection information read request Y03, the connection information response unit 54 confirms whether or not the connection information 62 is stored in the storage unit 56. If the connection information 62 is not stored in the storage unit 56, the connection information response unit 54 instructs the connection information generation unit 57 to generate the connection information 62. The connection information generation unit 57 refers to the third layer network information 61 stored in the storage unit 56 to confirm whether or not a bridge station is connected to the third layer network. Since no bridge station is connected to the third layer network, the connection information generation unit 57 generates the connection information 62 based on the third layer network information 61. The connection information 62 generated by the connection information generation unit 57 of the bridge station 12 has the same contents as the third layer network information 61 set in the bridge station 12.

Here, the connection information generation unit 57 generates the connection information 62 according to the rule for describing information on the bridge station 12 in the head of the connection information 62 of the bridge station 12. That is, the connection information generation unit 57 gives the meaning of the connection configuration to the order of arrangement of communication devices in the connection information 62 to be generated. According to this rule, the order of communication devices described in the connection information 62 means that among the slave stations behind the bridge station, the bridge station or the slave station in the memory area of the shared memory used by the bridge station is a communication device connected to the lower layer network. In a case where the number of connected communication devices connected directly under the bridge station is used as the number of points of use, the communication device described in the number of connected devices behind the bridge station means a communication device connected directly under the bridge station. The term "directly under" refers to connection with the bridge station through the n-th layer network in the case of the bridge station connected to the (n−1)-th layer network and the n-th layer network. The term "in the memory area of the shared memory used by the bridge station" specifically refers to the range from a head address of the addresses assigned to the bridge station to an address indicated by the head address of the bridge station plus the number of points of use assigned to the bridge station.

The connection information generation unit 57 stores the generated connection information 62 of the bridge station 12 in the storage unit 56 and notifies the connection information response unit 54 of the completion of generation of the connection information 62. Upon receiving the notification, the connection information response unit 54 transmits a connection information read response Y04 addressed to the bridge station 11 that has transmitted the connection information read request. The connection information read response Y04 is a frame in which the connection information 62 of the bridge station 12 is stored.

In the bridge station 11 that has received the connection information read response Y04, the connection information acquisition unit 53 analyzes the connection information read response Y04 and passes the connection information 62 of the bridge station 12 stored in the connection information read response Y04 to the connection information generation unit 57.

The connection information generation unit 57 generates the connection information 62 of the bridge station 11 based on the connection information 62 of the bridge station 12 and the second layer network information 61 stored in the storage unit 56. When generating the connection information 62 of the bridge station 11, the connection information generation unit 57 determines, for the communication devices included in both the connection information 62 of the bridge station 12 and the second layer network information 61, whether or not the assigned memory areas of the addresses of the shared memory are coincident with each other using information on the head address and the number of points of use. That is, the connection information generation unit 57 checks whether or not the addresses of the shared memory assigned to different communication devices overlap each other based on the head addresses and the numbers of points of use for both of the second layer network information 61 and the connection information 62 of the bridge station 12. If the addresses of the shared memory assigned to different communication devices do not overlap each other, the connection information generation unit 57 generates, with respect to the second layer network information 61, the connection information 62 of the bridge station 11 by replacing information on a part for the bridge station 12 with information of the connection information 62 of the bridge station 12. The connection information generation unit 57 generates the connection information 62 of the bridge station 11 according to much the same rule as an operation of the connection information generation unit 57 of the bridge station 12. That is, the connection information generation unit 57 describes information on the bridge station 11 in the head of the connection information 62 of the bridge station 11.

The connection information generation unit 57 stores the generated connection information 62 of the bridge station 11 in the storage unit 56 and notifies the connection information response unit 54 of the completion of generation of the connection information 62. Upon receiving the notification, the connection information response unit 54 transmits, to the master station 2, a connection information read response Y05 addressed to the control system design support device 1 that has transmitted the connection information read request. The connection information read response Y05 is a frame in which the connection information 62 of the bridge station 11 is stored.

Upon receiving the connection information read response Y15 or the connection information read response Y05, the master station 2 determines that the destination is the control system design support device 1, and transfers the received connection information read response Y15 or connection information read response Y05 as a connection information read response Y06 to the control system design support device 1.

The control system design support device 1 interprets the connection information acquired through the connection information read response Y06 according to the rule used when the connection information 62 is generated in each of the bridge stations 11 and 12. Consequently, the control system design support device 1 can recognize which communication devices are connected to each layered network even in a case where the network configuration of the communication system 100 is composed of a plurality of layers.

Below is a description of a case where the connection information generation unit 57 of the bridge station 11 generates the connection information 62 of the bridge station 11, and in particular a case where the connection information generation unit 57 confirms the addresses of the shared memory assigned to different communication devices using the head addresses and the numbers of points of use for both of the second layer network information 61 and the connection information 62 of the bridge station 12, and finds that the addresses of the shared memory assigned to different communication devices overlap each other.

Figure 6:
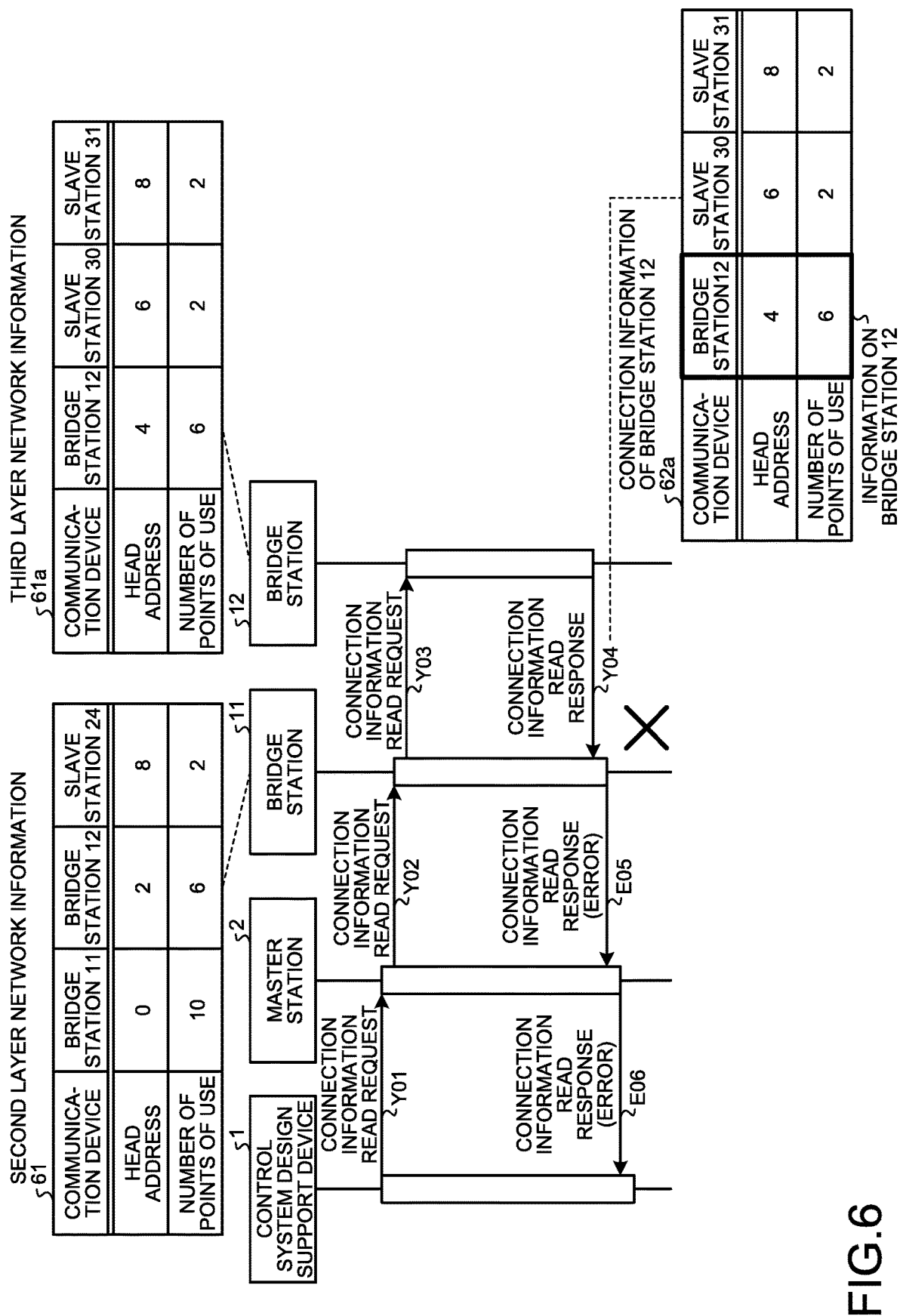
FIG. 6 is a sequence diagram illustrating a process in a case where an error is caused when the control system design support device of the communication system according to the first embodiment acquires connection information stored in the bridge station.

FIG. 6 is a sequence diagram illustrating a process in the case where an error is caused when the control system design support device acquires the connection information 62 stored in the bridge station 11 in the communication system 100 according to the first embodiment. Note that the steps from the connection information read request Y01 to the connection information read request Y03 are the same as those in FIG. 5.

Upon receiving the connection information read request Y03, the bridge station 12 transmits the connection information read response Y04 to the bridge station 11 as in the case of FIG. 5. However, FIG. 6 is based on the assumption that, in third layer network information 61a stored by the bridge station 12, the head addresses of the shared memory assigned to the communication devices, that is, the bridge station 12 and the slave stations 30 and 31, are different from those in FIG. 5. Therefore, connection information 62a of the bridge station 12 generated by the bridge station 12 is also different from that in FIG. 5.

In the bridge station 11 that has received the connection information read response Y04, the connection information acquisition unit 53 analyzes the connection information read response Y04 and passes the connection information 62a of the bridge station 12 stored in the connection information read response Y04 to the connection information generation unit 57.

The connection information generation unit 57 generates the connection information 62 of the bridge station 11 based on the connection information 62a of the bridge station 12 and the second layer network information 61 stored in the storage unit 56. The connection information generation unit 57 confirms whether or not the addresses of the shared memory assigned to different communication devices overlap each other using the head addresses and the numbers of points of use for both of the second layer network information 61 and the connection information 62a of the bridge station 12. In the example of FIG. 6, six points from the head address "2", that is, addresses "2" to "7", are assigned to the bridge station 12 in the second layer network information 61. In the second layer network information 61, two points from the head address "8", that is, addresses "8" to "9", are assigned to the slave station 24. On the other hand, in the connection information 62a of the bridge station 12, six points from the head address "4", that is, addresses "4" to "9", are assigned to the bridge station 12. In this case, there is overlap in address between the bridge station 12 and the slave station 24, which are different communication devices, in the part from the address "8" to the address "9", thereby leading to a state in which an error occurs. The connection information generation unit 57 notifies the connection information response unit 54 that overlap in address is present in different communication devices and some error has been caused.

Upon receiving the notification, the connection information response unit 54 transmits, to the master station 2, a connection information read response E05 addressed to the control system design support device 1 that has transmitted the connection information read request. The connection information read response E05 indicates the occurrence of error. The connection information read response E05 is a frame with information stored therein indicating that the occurrence of error in the bridge station 11 has caused failure in generation of the connection information 62 of the bridge station 11.

Upon receiving the connection information read response E05, the master station 2 determines that the destination is the control system design support device 1, and transfers the received connection information read response E05 as a connection information read response E06 to the control system design support device 1.

Upon receiving the connection information read response E05, the control system design support device 1 notifies the user of the error in the process of acquiring the connection information 62 stored by the bridge station 11. As a result, the user can recognize a mistake in address setting for the third layer network information 61a in the bridge station 12, and can review the n-th layer network information set in each bridge station to correct the overlapping of addresses.

Figure 7:
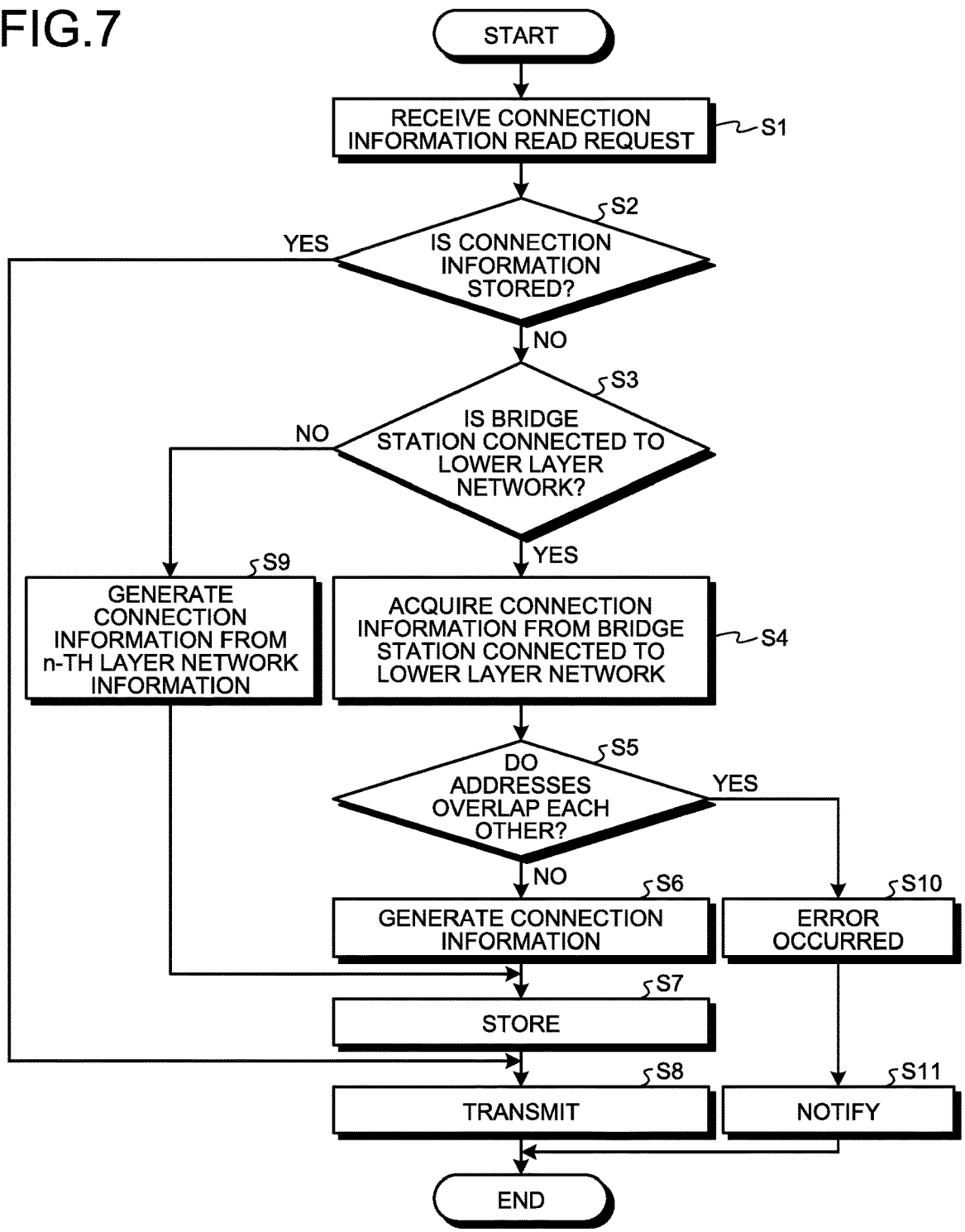
FIG. 7 is a flowchart illustrating a process of receiving a connection information read request and returning a connection information read response in a bridge station according to the first embodiment.

FIG. 7 is a flowchart illustrating a process of receiving a connection information read request and returning a connection information read response in the bridge stations 11 to 13 according to the first embodiment.

Once a bridge station receives a connection information read request from the master station 2 or the bridge station of the upper layer network (step S1), the connection information response unit 54 confirms whether or not the connection information 62 is stored in the storage unit 56 (step S2). If the connection information 62 is not stored in the storage unit 56 (step S2: No), the connection information generation unit 57 refers to the device unique code of the n-th layer network information 61 stored in the storage unit 56 to confirm whether or not a bridge station is connected to the lower layer network, that is, the n-th layer network (step S3).

If a bridge station is connected to the n-th layer network (step S3: Yes), the connection information acquisition unit 53 receiving a request from the connection information generation unit 57 acquires connection information from the bridge station connected to the n-th layer network (step S4).

The connection information generation unit 57 confirms whether or not the addresses of the shared memory assigned to different communication devices overlap each other in the n-th layer network information 61 and the connection information 62 acquired from the bridge station of the n-th layer network (step S5). If the addresses of the shared memory assigned to different communication devices do not overlap each other (step S5: No), the connection information generation unit 57 generates the connection information 62 of its own station using the n-th layer network information 61 and the connection information 62 acquired from the bridge station of the n-th layer network (step S6), and stores the generated connection information 62 in the storage unit 56 (step S7). Upon receiving the notification of the completion of generation of the connection information 62 from the connection information generation unit 57, the connection information response unit 54 transmits a connection information read response including the connection information stored in the storage unit 56 to the master station 2 or the bridge station of the upper layer network (step S8).

If the connection information 62 is stored in the storage unit 56 (step S2: Yes), the connection information response unit 54 transmits a connection information read response including the connection information stored in the storage unit 56 to the master station 2 or the bridge station of the upper layer network (step S8).

If no bridge station is connected to the n-th layer network (step S3: No), the connection information generation unit 57 generates the connection information 62 of its own station from the n-th layer network information 61 stored in the storage unit 56 (step S9), and stores the generated connection information 62 in the storage unit 56 (step S7).

If the addresses of the shared memory assigned to different communication devices overlap each other (step S5: Yes), the connection information generation unit 57 determines that an error has occurred in the process of generating the connection information 62 of its own station (step S10), and notifies the connection information response unit 54. Then, the connection information response unit 54 transmits a connection information read response indicating the occurrence of error to the master station 2 or the bridge station of the upper layer network to notify the master station 2 or the bridge station of the upper layer network of the occurrence of error (step S11).

Subsequently, the hardware configuration of the bridge stations 11 to 13 will be described. Since the bridge stations 11 to 13 have similar configurations, the bridge station 11 will be described as a representative example. In the bridge station 11, the (n−1)-th layer communication unit 51, the n-th layer communication unit 52, and the relay unit 55 are realized by an interface circuit that communicates with other communication devices. The storage unit 56 is realized by a memory. The connection information acquisition unit 53, the connection information response unit 54, and the connection information generation unit 57 are realized by a processing circuit. That is, the bridge station 11 includes a processing circuit that acquires the connection information 62 from the bridge station connected to the n-th layer network, generates the connection information 62 of the bridge station 11 from the n-th layer network information 61 stored in the storage unit 56, or the n-th layer network information 61 stored in the storage unit 56 and the connection information 62 acquired from a bridge station connected to the n-th layer network, and transmits the generated connection information 62 of the bridge station 11 to the master station 2 or the bridge station of the (n−1)-th layer network. The processing circuit may be dedicated hardware, or may be a memory and a CPU that executes a program stored in the memory.

Figure 8:
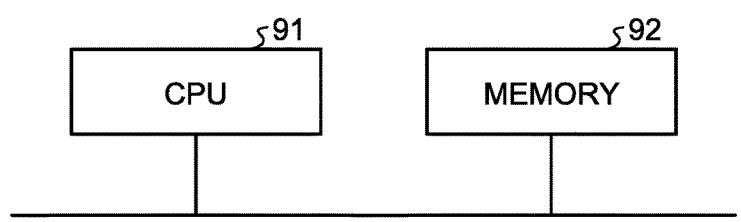
FIG. 8 is a diagram illustrating an exemplary case where a processing circuit included in a bridge station according to the first embodiment is implemented using a CPU and a memory.

FIG. 8 is a diagram illustrating an exemplary case where the processing circuit of the bridge station 11 according to the first embodiment is implemented by a CPU and a memory. In a case where the processing circuit is configured to include a CPU 91 and a memory 92, each function of the processing circuit is realized by software, firmware, or a combination of software and firmware. Software or firmware is described as a program and stored in the memory 92. In the processing circuit, the CPU 91 reads and executes a program stored in the memory 92, thereby realizing each function. That is, the bridge station 11 includes the memory 92 for storing programs that eventually execute a step of acquiring the connection information 62 from the bridge station connected to the n-th layer network, a step of generating the connection information 62 of the bridge station 11, and a step of transmitting the generated connection information 62 of the bridge station 11 when the connection information acquisition unit 53, the connection information response unit 54, and the connection information generation unit 57 are implemented by the processing circuit. It can also be said that these programs cause a computer to execute the procedures and methods for the processing circuit of the bridge station 11. The CPU 91 may be a processing device, a computing device, a microprocessor, a microcomputer, a processor, a digital signal processor (DSP), or the like. Examples of the memory 92 include a non-volatile or volatile semiconductor memory, a magnetic disk, a flexible disk, an optical disc, a compact disc, a mini disc, a digital versatile disc (DVD), and the like. Examples of non-volatile or volatile semiconductor memories include a random access memory (RAM), a read only memory (ROM), a flash memory, an erasable programmable ROM (EPROM), an electrically EPROM (EEPROM), and the like.

As described above, according to the present embodiment, in response to a connection information read request from a communication device of the upper layer network, the bridge stations 11 to 13 transmit connection information. The connection information includes information on the device unique code, the head address, and the number of points of use of the first communication device and the second communication device. The first communication device is connected to the lower layer network. The second communication device is connected to the networks ranging from the network below the first communication device to the lowermost layer network. The connection information has information on each communication device, which is arranged in a format that can specify the network layer to which each communication device is connected. Consequently, the control system design support device 1 or the like that has acquired the connection information can recognize the connection relation between the communication devices in the multi-layer network.

Further, the bridge stations 11 to 13 confirm whether or not the addresses of the shared memory assigned to different communication devices overlap each other when generating connection information, and issue a notification of error when detecting overlapping of assignment. In this way, it is possible to urge the user to resolve the overlapping of assignment and to prevent competitive assignment.

In the communication system 100, it is enough for the slave stations 21 to 33 to have the same configuration as the conventional slave stations as long as only the bridge stations 11 to 13 have the functions described in the present embodiment. Therefore, the communication system 100 can be configured without the need of repairing the slave stations 21 to 33. The bridge stations 11 to 13 collect, manage, and hide the connection information of the lower layer networks. Therefore, the master station 2 does not need to manage the entire multi-layer network, so that the communication system 100 can be configured without the need of repairing the master station 2. In this manner, the bridge stations 11 to 13 have the functions that support the multi-layer networks, and thereby the communication system 100 that is multi-layer networks can be configured together with the master station 2 and slave stations 21 to 33 which do not have any functions that support the multi-layer networks.

Second Embodiment

In the first embodiment, in the event of an error in generating the connection information 62 of a bridge station, the bridge station notifies the control system design support device 1 of the occurrence of error. This case is on the premise that the user corrects the cause of the error. In the second embodiment, the cause of an error is corrected by one or both of the bridge station that has detected the occurrence of error and the bridge station connected to the n-th layer network. The differences from the first embodiment will be described.

FIG. 9 is a sequence diagram illustrating a process of correcting the cause of an error when the control system design support device 1 acquires the connection information 62 stored in the bridge station 11 in the communication system 100 according to the second embodiment. Note that the steps from the connection information read request Y01 to the connection information read response Y04 are the same as those in FIG. 6.

In the bridge station 11 that has received the connection information read response Y04, the connection information acquisition unit 53 analyzes the connection information read response Y04 and passes the connection information 62a of the bridge station 12 stored in the connection information read response Y04 to the connection information generation unit 57.

The connection information generation unit 57 generates the connection information 62 of the bridge station 11 based on the connection information 62a of the bridge station 12 and the second layer network information 61 stored in the storage unit 56. The connection information generation unit 57 confirms whether or not the addresses of the shared memory assigned to different communication devices overlap each other using the head addresses and the numbers of points of use for both of the second layer network information 61 and the connection information 62a of the bridge station 12. In the example of FIG. 9, as in the case of FIG. 6, six points from the head address "2", that is, addresses "2" to "7", are assigned to the bridge station 12 in the second layer network information 61. In the second layer network information 61, two points from the head address "8", that is, the address "8" to the address "9", are assigned to the slave station 24. On the other hand, in the connection information 62a of the bridge station 12, six points from the head address "4", that is, the address "4" to the address "9", are assigned to the bridge station 12. In this case, there is overlap in address between the bridge station 12 and the slave station 24 in a part for the addresses "8" to "9", and so this situation is regarded as having an error caused.

The connection information generation unit 57 compares the connection information 62a of the bridge station 12 with information on the bridge station 12 described in the second layer network information 61 to detect the fact that their numbers of points of use are equal to each other and their head addresses are different from each other. In this case, the connection information generation unit 57 instructs the connection information acquisition unit 53 to correct the head address described in the connection information 62a of the bridge station 12, that is, to set the head address of the connection information 62a to "2" which is the same as the head address of the information on the bridge station 12 described in the second layer network information 61. The connection information acquisition unit 53 transmits a head address setting request Y11 to the bridge station 12, the request Y11 being formed to request the bridge station 12 to correct the head address described in the connection information 62a of the bridge station 12 to "2".

In the bridge station 12 having received the head address setting request Y11, the connection information generation unit 57 changes the head address of the bridge station 12 from "4" to "2" with respect to the connection information 62a of the bridge station 12 stored in the storage unit 56. In accordance with this change, the connection information generation unit 57 changes the head address of the slave station 30 from "6" to "4" and changes the head address of the slave station 31 from "8" to "6". As a result, the connection information 62 of the bridge station 12 stored in the storage unit 56 has the same contents as that illustrated in FIG. 5. The connection information generation unit 57 also corrects the third layer network information 61a stored in the storage unit 56 in a manner similar to that for the connection information 62a of the bridge station 12. As a result, the third layer network information 61a stored in the storage unit 56 has the same contents as that illustrated in FIG. 5. After correcting the head address of the connection information 62a of the bridge station 12, the connection information generation unit 57 transmits, to the bridge station 11, a head address setting response Y12 indicating that the head address has been corrected. The connection information generation unit 57 transmits the head address setting response Y12 including the corrected connection information 62 of the bridge station 12.

In the bridge station 11 that has received the head address setting response Y12, the connection information acquisition unit 53 notifies the connection information generation unit 57 that the connection information 62 of the bridge station 12 has been corrected in the bridge station 12. Using the second layer network information 61 and the connection information 62 acquired from the bridge station 12, the connection information generation unit 57 generates the connection information 62 of its own station.

On the other hand, the connection information generation unit 57 of the bridge station 11 compares the connection information 62 of the bridge station 12 with information on the bridge station 12 described in the second layer network information 61, and if the unit 57 detects the fact that their numbers of points of use are different from each other, the connection information generation unit 57 determines that the number of points of use described in the connection information 62 of the bridge station 12 is true, and resets information on the number of points of use of the bridge station 12 described in the second layer network information 61 with the information on the number of points of use described in the connection information 62 of the bridge station 12. At this time, the connection information generation unit 57 resets the head address of the bridge station 12 described in the second layer network information 61 with the current head address or the lowest head address in the free area. The connection information generation unit 57 generates the connection information 62 of its own station using the corrected second layer network information 61 and the connection information 62 acquired from the bridge station 12.

The method of generating the connection information 62 of its own station in the connection information generation unit 57 is the same as that of the first embodiment. Upon receiving the notification of the completion of generation from the connection information generation unit 57, the connection information response unit 54 transmits, to the master station 2, the connection information read response Y05 addressed to the control system design support device 1 that has transmitted the connection information read request.

Upon receiving the connection information read response Y05, the master station 2 determines that the destination is the control system design support device 1, and transfers the received connection information read response Y05 as the connection information read response Y06 to the control system design support device 1.

Figure 10:
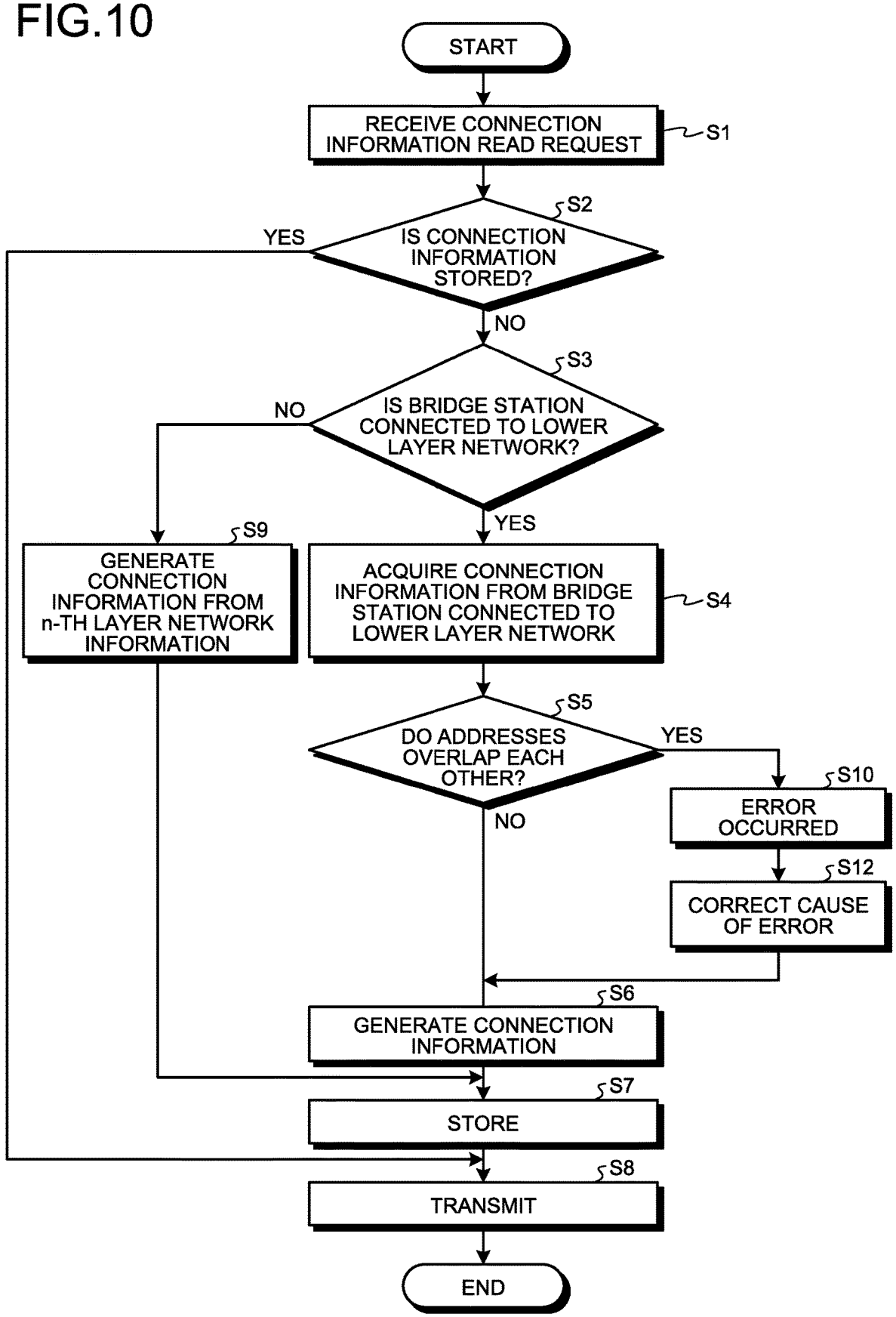
FIG. 10 is a flowchart illustrating a process of receiving a connection information read request and returning a connection information read response in a bridge station according to the second embodiment.

FIG. 10 is a flowchart illustrating a process of receiving a connection information read request and returning a connection information read response in the bridge stations 11 to 13 according to the second embodiment. In FIG. 10, steps S1 to S10 are the same as those of the first embodiment illustrated in FIG. 7.

In the bridge station, if the addresses of the shared memory assigned to different communication devices overlap each other (step S5: Yes), the connection information generation unit 57 determines that an error has occurred in the process of generating the connection information 62 of its own station (step S10), and corrects the cause of the error (step S12).

Figure 11:
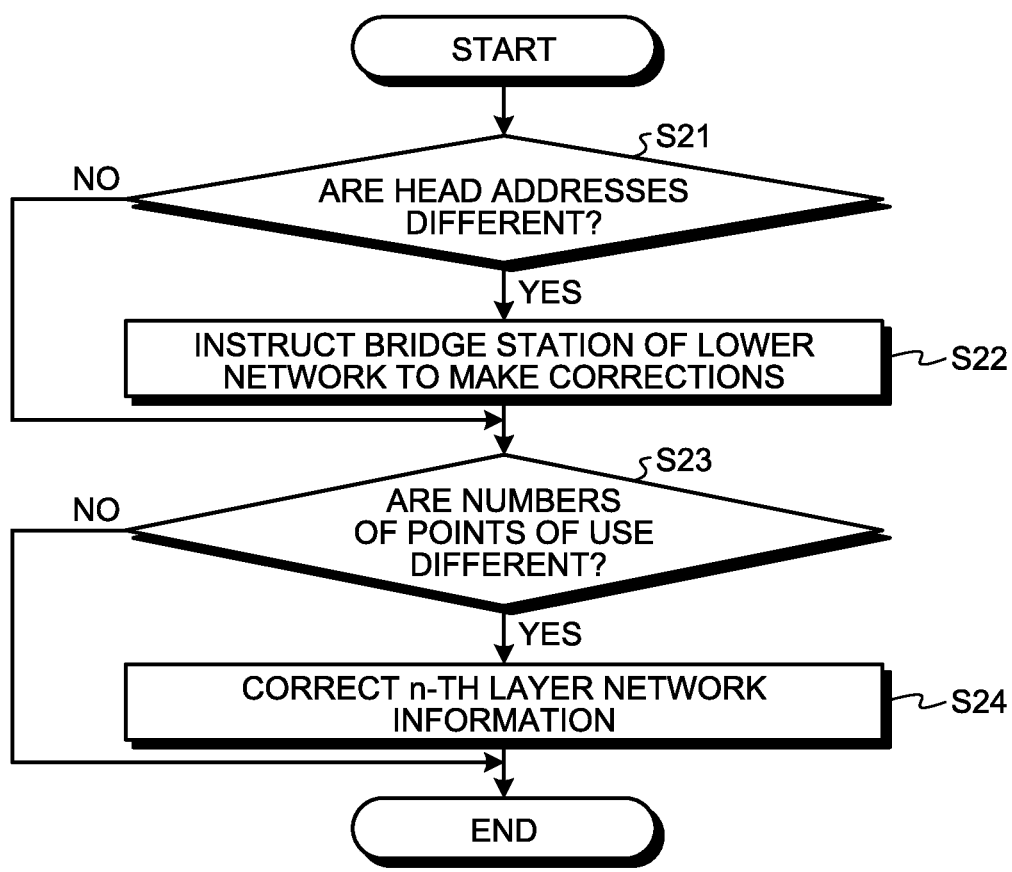
FIG. 11 is a flowchart illustrating a method of correcting the cause of an error when the error is caused in generating connection information in the bridge station according to the second embodiment.

FIG. 11 is a flowchart illustrating a method of correcting the cause of an error in generating connection information in the bridge stations 11 to 13 according to the second embodiment.

The bridge station connected to the (n−1)-th layer network compares the connection information 62 of the bridge station connected to the n-th layer network with information on the bridge station described in the n-th layer network information 61. If these items of information have different head addresses (step S21: Yes), the bridge station instructs the bridge station connected to the lower network, that is, the n-th layer network, to correct the head address (step S22). If these items of information have the same head address (step S21: No), a process of step S22 is skipped.

The bridge station connected to the (n−1)-th layer network compares the connection information 62 of the bridge station connected to the n-th layer network with information on the bridge station described in the n-th layer network information 61. If these items of information have different numbers of points of use (step S23: Yes), the bridge station corrects the n-th layer network information 61 of its own station (step S24). If these items of information have the same number of points of use (step S23: No), a process of step S24 is skipped.

Returning to the flowchart of FIG. 10, in the bridge station connected to the (n−1)-th layer network, the connection information generation unit 57 generates the connection information 62 of its own station using the n-th layer network information 61 and the connection information 62 acquired from the bridge station of the n-th layer network (step S6). The subsequent steps are the same as those in the first embodiment. In FIG. 10, a process of step S6 is performed after a process of step S12, but a process of step S5 may be performed after a process of step S12.

As described above, according to the present embodiment, when the bridge stations 11 to 13 detect an error in generating the connection information 62 of the bridge station, the error being caused by the fact that the addresses of the shared memory assigned to different communication devices overlap each other, at least one of the bridge station and the bridge station of the lower network corrects the cause of the error. Thus, the error can be resolved without the need for the user to make corrections.

Third Embodiment

In the third embodiment, the control system design support device 1 communicates with a slave station using the connection information 62 acquired from the bridge station 11 and using the head address as a destination.

Figure 12:
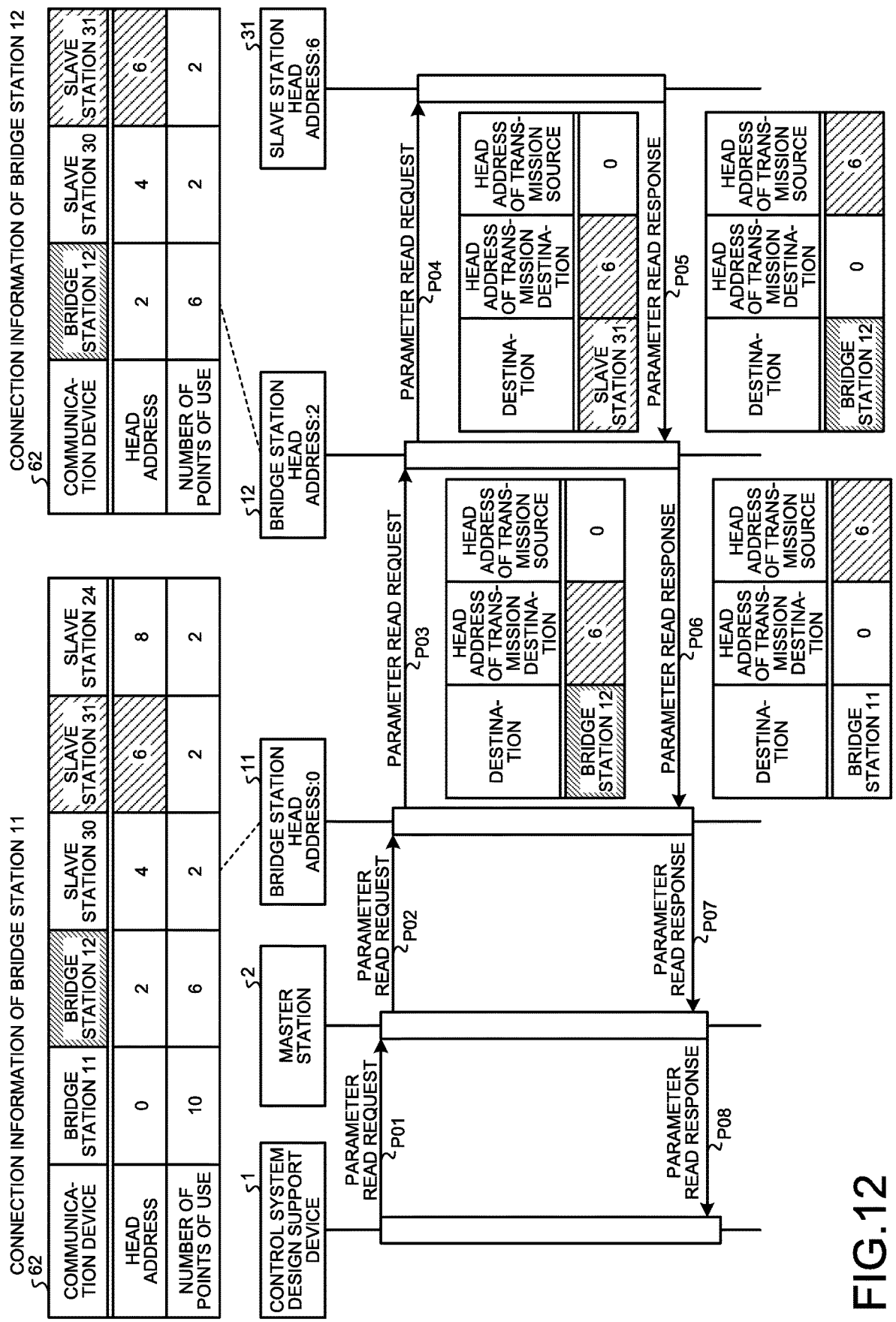
FIG. 12 is a sequence diagram illustrating an example process in which a control system design support device of a communication system according to a third embodiment reads out a parameter of a slave station.

FIG. 12 is a sequence diagram illustrating an example process in which the control system design support device 1 reads out the parameter of the slave station 31 in the communication system 100 according to the third embodiment.

Parameter read requests illustrated in FIG. 12 are frames used in reading the parameter of the slave station 31. In FIG. 12, only the destination, the head address of the transmission destination, and the head address of the transmission source are described as a parameter read request, but this is the header portion of the frame. In practice, information indicating a parameter read request is stored in a data portion (not illustrated). A parameter read response illustrated in FIG. 12 is a frame used by the slave station 31 when the slave station 31 transmits the parameter. In FIG. 12, only the destination, the head address of the transmission destination, and the head address of the transmission source are described as a parameter read response, but this is the header portion of the frame. In practice, information of the parameter is stored in a data portion (not illustrated).

In a case where the slave station 31 is a device that controls input/output of signals, for example, the parameter is information indicating the timings of the input and output of signals set in the slave station 31. This case is indifferent about types of parameters, and so the above-described examples are not any limiting condition.

The control system design support device 1 transmits, to the master station 2, a parameter read request P01 for the head address "6" addressed to the bridge station 11.

The master station 2 that has received the parameter read request P01 from the control system design support device 1 transfers the parameter read request P01 as a parameter read request P02 to the bridge station 11 because the destination is the bridge station 11.

In the bridge station 11 that has received the parameter read request P02, the relay unit 55 analyzes the parameter read request P02 and confirms that the parameter read request P02 is addressed to the head address "6". The relay unit 55 refers to the connection information 62 stored in the storage unit 56 to confirm the relay destination of the head address "6". Upon confirming that the head address "6" is within the shared memory area managed in the bridge station 12, the relay unit 55 transmits the parameter read request P02 as a parameter read request P03 to the bridge station 12. At this time, the relay unit 55 of the bridge station 11 stores information that the parameter read request P02 has been transmitted from the master station 2, and waits for a response.

In the bridge station 12 that has received the parameter read request P03, the relay unit 55 refers to the connection information 62 stored in the storage unit 56, and when the relay unit 55 confirms that the head address "6" is a head address set in the slave station 31, the relay unit 55 transmits the parameter read request P03 as a parameter read request P04 to the slave station 31.

Upon receiving the parameter read request P04, the slave station 31 replaces the head address of the transmission source of the parameter read request P04 with the head address of the transmission destination of the parameter read request P04, and transmits a parameter read response P05 including the parameter requested through the parameter read request P04 to the bridge station 12 that has transmitted the parameter read request P04.

In the bridge station 12 that has received the parameter read response P05, the relay unit 55 confirms the head address of the transmission destination and confirms the connection information 62 stored in the storage unit 56. In a case where an unknown head address that is not described in the connection information 62 is set as the head address of the transmission destination, the relay unit 55 relays the parameter read response P05 to the bridge station 11 that is a bridge station of the upper first layer network. Therefore, the bridge station 12 transmits the received parameter read response P05 to the bridge station 11 as a parameter read response P06.

In the bridge station 11 that has received the parameter read response P06, the relay unit 55 confirms the head address of the transmission destination and confirms the connection information 62 stored in the storage unit 56. The relay unit 55 confirms that the head address of the transmission destination matches its own station, and confirms that the parameter read response P06 is a response to the parameter read request P01 from the control system design support device 1, that is, the parameter read request P02 received from the master station 2. The relay unit 55 stops waiting for a response, and transmits, to the master station 2, the received parameter read response P06 as a parameter read response P07 addressed to the control system design support device 1.

Upon receiving the parameter read response P07, the master station 2 transfers the parameter read response P07 as a parameter read response P08 to the control system design support device 1.

Figure 13:
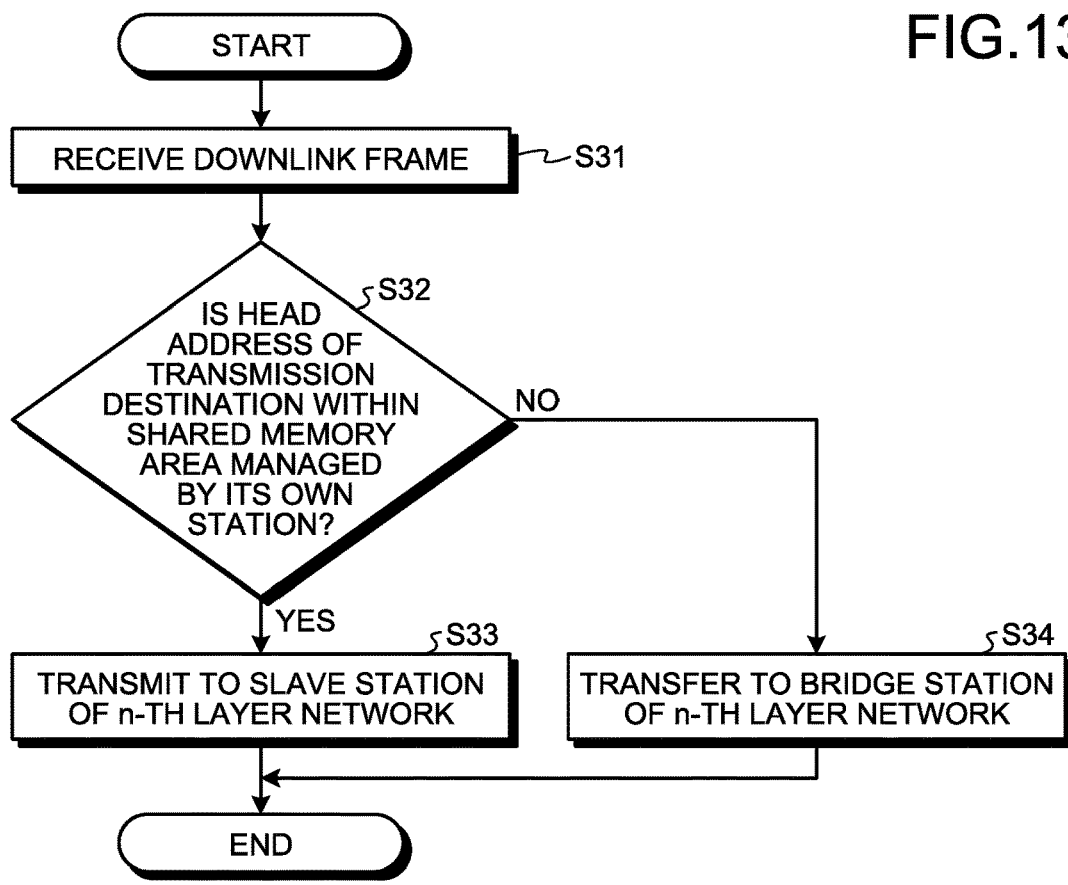
FIG. 13 is a flowchart illustrating a downlink frame transfer process in a bridge station according to the third embodiment.

FIG. 13 is a flowchart illustrating a downlink frame transfer process in a bridge station according to the third embodiment. In the bridge station, once the relay unit 55 receives a downlink frame from the upper layer network (step S31), the relay unit 55 confirms the head address of the transmission destination of the received frame (step S32). If the head address of the transmission destination is within the shared memory area managed by its own station (step S32: Yes), the relay unit 55 transmits the received frame to the slave station corresponding to the head address of the transmission destination in the n-th layer network (step S33). If the head address of the transmission destination is outside the shared memory area managed by its own station (step S32: No), the relay unit 55 transfers the received frame to the bridge station of the n-th layer network (step S34).

Figure 14:
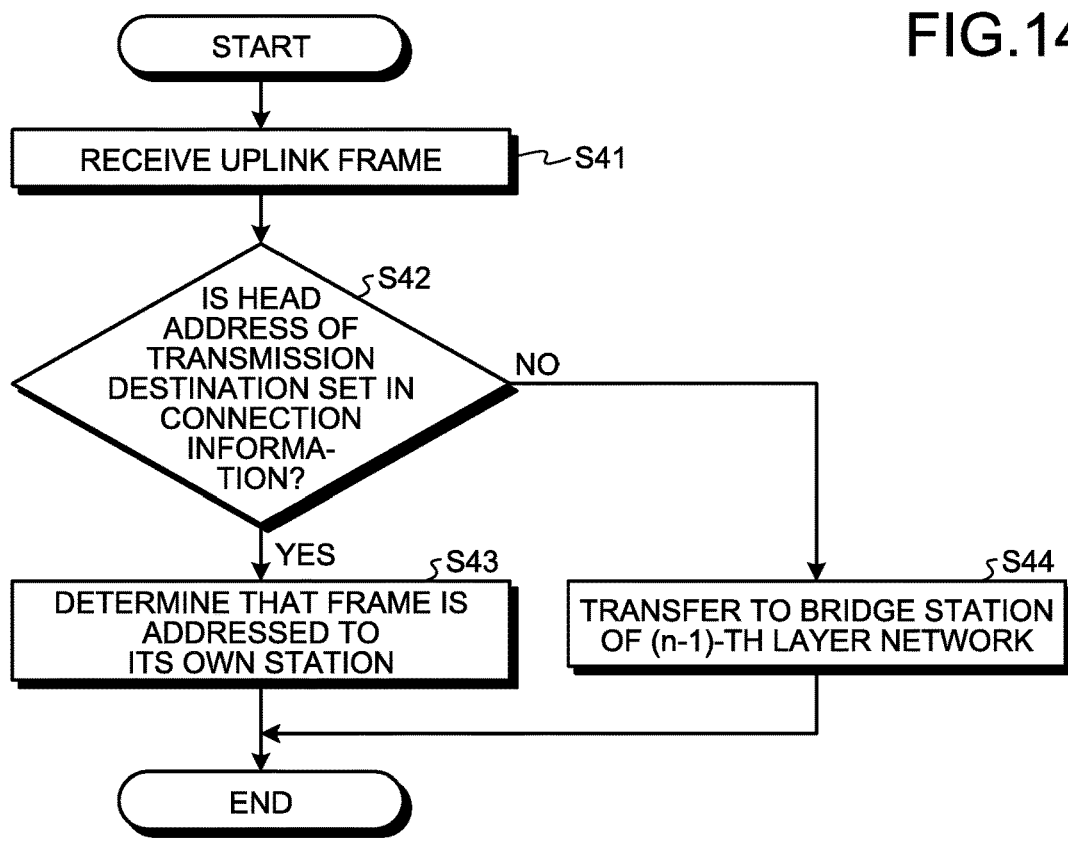
FIG. 14 is a flowchart illustrating an uplink frame transfer process in a bridge station according to the third embodiment.

FIG. 14 is a flowchart illustrating an uplink frame transfer process in a bridge station according to the third embodiment. In the bridge station, once the relay unit 55 receives an uplink frame from the lower layer network (step S41), the relay unit 55 confirms the head address of the transmission destination of the received frame (step S42). If the head address of the transmission destination is an address set in the connection information (step S42: Yes), the relay unit 55 determines that the frame is addressed to its own station (step S43). If the head address of the transmission destination is an address that is not set in the connection information (step S42: No), the relay unit 55 transfers the frame to the bridge station of the (n−1)-th layer network (step S44).

As described above, according to the present embodiment, each of the bridge stations 11 to 13 confirms the head address of the transmission destination of a received downlink frame, transmits the frame to the slave station corresponding to the head address of the transmission destination if the head address of the transmission destination is within the shared memory area managed by the bridge station, and transfers the frame to the lower layer bridge station if the head address of the transmission destination is outside the shared memory area managed by the bridge station. In addition, each of the bridge stations 11 to 13 confirms the head address of the transmission destination of a received uplink frame, determines that the frame is addressed to the bridge station if the head address of the transmission destination is within the shared memory area managed by the bridge station, and transfers the frame to the upper layer bridge station if the head address of the transmission destination is outside the shared memory area managed by the bridge station. Thus, in the communication system 100, the control system design support device 1 and each communication device can communicate with each other using the head address as a destination, and it is possible to construct a multi-layer network using one shared memory.

Fourth Embodiment

In the first to third embodiments, description has been given mainly about the operation of bridge stations. In the fourth embodiment, description is given about an operation of the control system design support device 1, in which the device 1 displays the network configuration of the communication system 100 from the connection information 62 of the bridge station 11 acquired from the master station 2.

Figure 15:
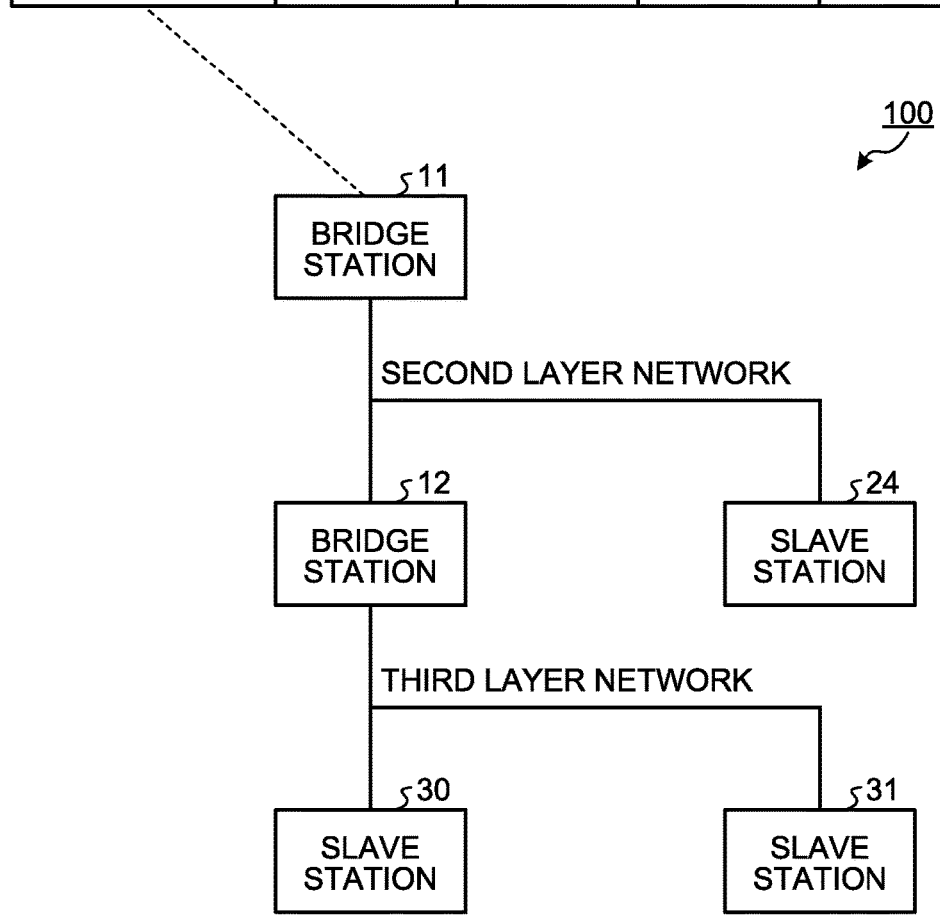
FIG. 15 is a diagram illustrating an example of network layers and communication devices to be displayed by a control system design support device according to a fourth embodiment.

FIG. 15 is a diagram illustrating an example of network layers and communication devices to be displayed by the control system design support device 1 according to the fourth embodiment. The control system design support device 1 displays, based on the connection information 62 of the bridge station 11 acquired from the master station 2 connected thereto, the connection relation between the bridge station 11 and the communication devices that belong to the second layer network and the third layer network.

Figure 16:
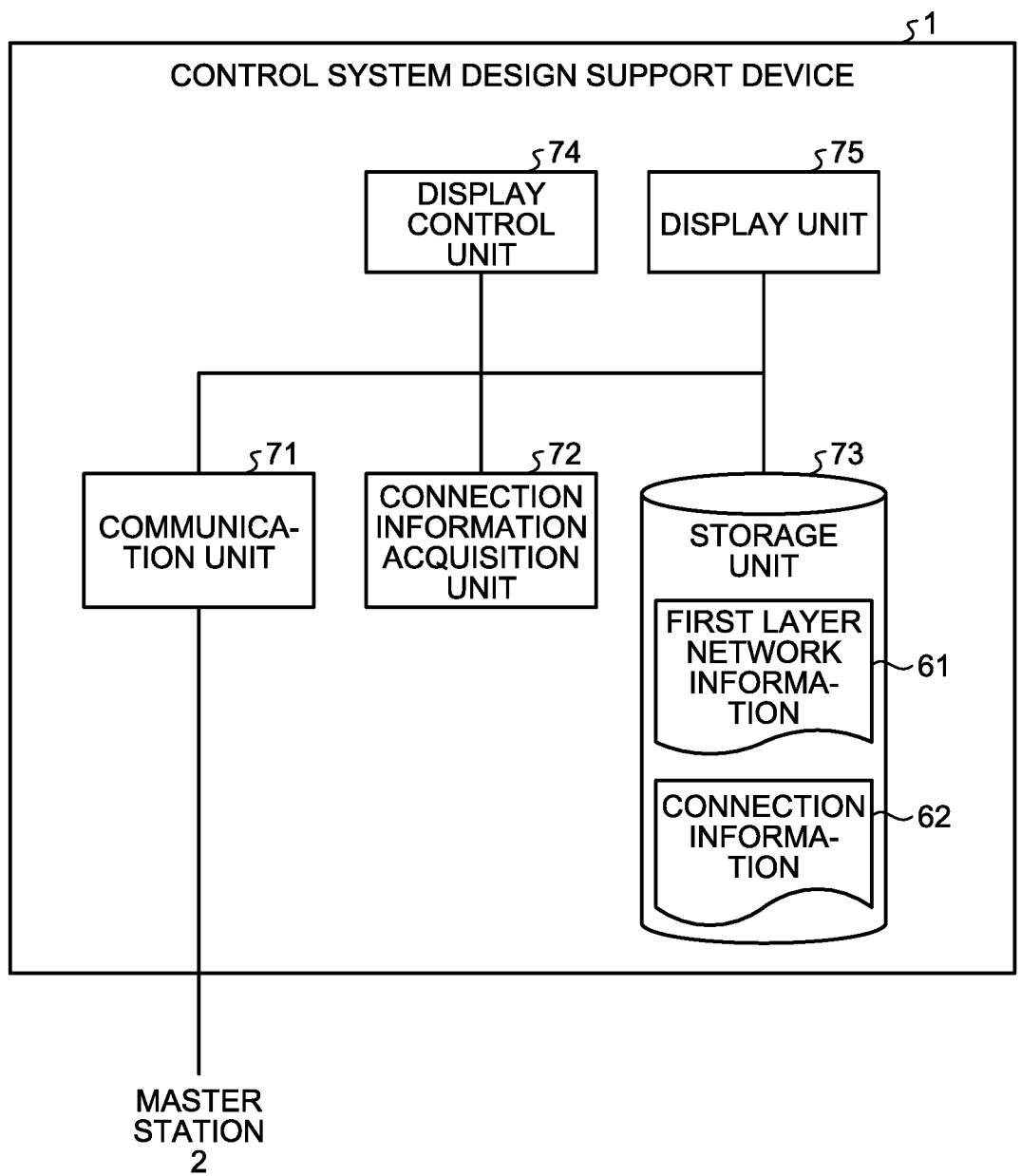
FIG. 16 is a block diagram illustrating an exemplary configuration of the control system design support device according to the fourth embodiment.

FIG. 16 is a block diagram illustrating an exemplary configuration of the control system design support device 1 according to the fourth embodiment. The control system design support device 1 includes a communication unit 71, a connection information acquisition unit 72, a storage unit 73, a display control unit 74, and a display unit 75.

The communication unit 71 controls communication with the master station 2.

The connection information acquisition unit 72 acquires, via the master station 2 from the bridge station 11 connected to the highest layer network, that is, the first layer network, the connection information 62 stored in the storage unit 56 of the bridge station 11.

The storage unit 73 stores the first layer network information 61 and the connection information 62 of the bridge station 11 acquired by the connection information acquisition unit 72. In the case of the example illustrated in FIG. 3, the first layer network information 61 is information indicating connection information of the master station 2, the bridge station 11, and the slave station 21. The first layer network information 61 may be acquired from the master station 2, or may be set in advance when the user constructs the first layer network, as in the bridge station. The control system design support device 1 confirms the first layer network information 61 thereby making it possible to recognize that the bridge station 11 exists in the first layer network.

The display control unit 74 refers to the connection information 62 of the storage unit 73 to perform control to display the network configuration of the communication system 100 on the display unit 75. Specifically, the display control unit 74 specifies the network layer of each communication device from the arrangement of information parts on the communication devices described in the connection information 62 of the storage unit 73, and performs control to distinguish between network layers to which the communication devices are connected and to display the network configuration of the communication system 100. The detailed operation of the display control unit 74 will be described later.

The display unit 75 displays the network configuration of the communication system 100 under the control of the display control unit 74. It should be noted that the display unit 75 may be provided outside the control system design support device 1, instead of being provided in the control system design support device 1.

Figure 17:
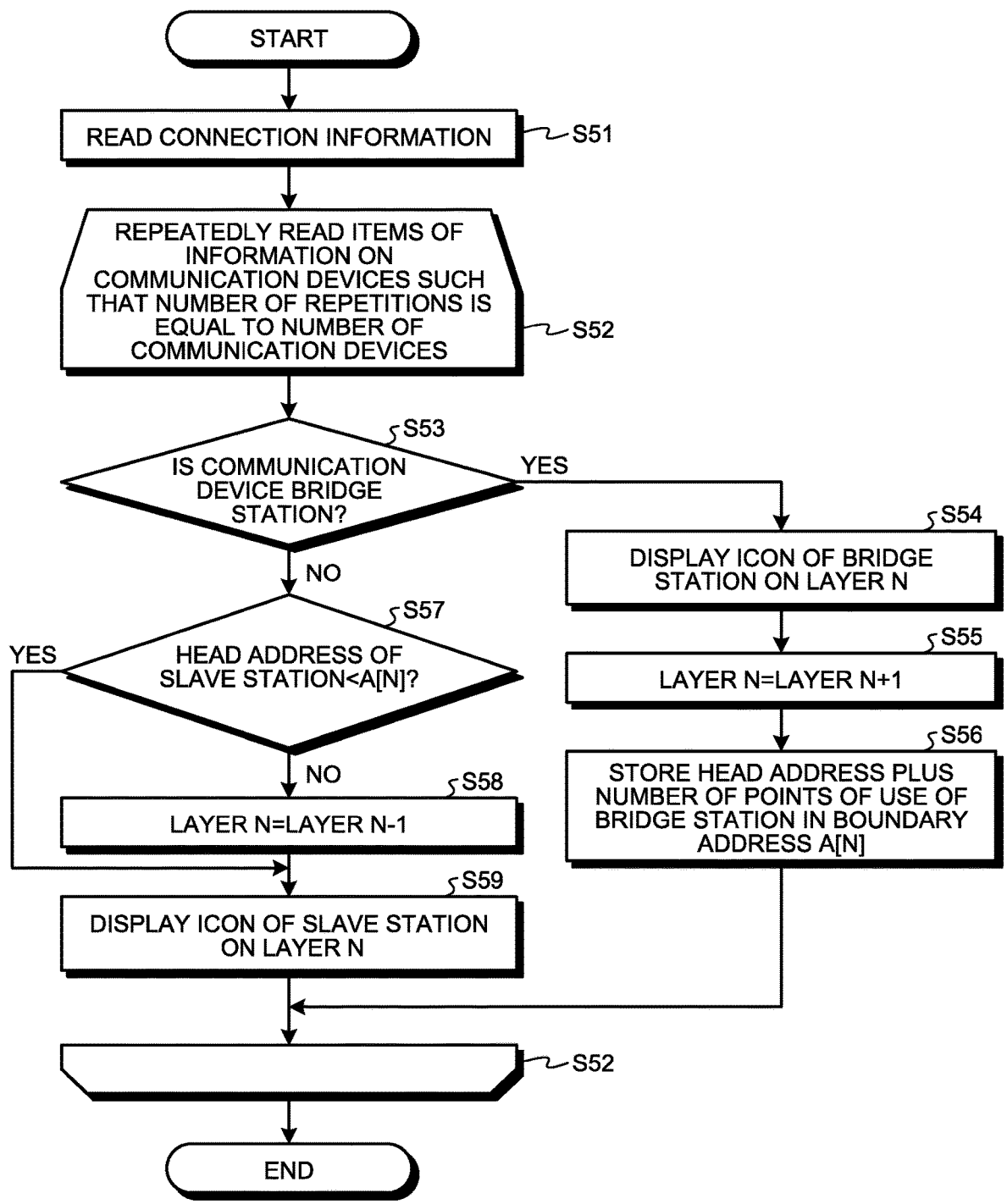
FIG. 17 is a flowchart illustrating the operation of the control system design support device according to the fourth embodiment displaying the network configuration of a communication system.

Next, the operation of the control system design support device 1 displaying the network configuration of the communication system 100 will be described. FIG. 17 is a flowchart illustrating the operation in which the control system design support device 1 according to the fourth embodiment displays the network configuration of the communication system 100. This flowchart is based on the premise that the connection information acquisition unit 72 of the control system design support device 1 has acquired the connection information 62 from the bridge station 11 and stored the connection information 62 in the storage unit 73 in the operation described in the first to third embodiments.

The display control unit 74 reads the connection information 62 from the storage unit 73 (step S51). From the connection information 62, the display control unit 74 repeatedly reads items of information on the communication devices in the connection information 62 (step S52). The number of repetitions on this occasion is equal to the number of communication devices. In the example of FIG. 15, the display control unit 74 sequentially reads items of information on the communication devices described in the connection information 62 from the left end.

The display control unit 74 reads the item of information on the communication device indicated by L11 at the left end of the connection information 62 and determines whether or not the communication device indicated by L11 is a bridge station (step S53). As described above, information indicated by a communication device in the connection information 62 is actually specified by a device unique code. Therefore, the display control unit 74 can determine whether the target communication device is a bridge station or not, namely, a bridge station or a slave station by confirming the device unique code of each communication device. Since the communication device indicated by L11 is the bridge station 11 (step S53: Yes), the display control unit 74 displays an icon of the bridge station 11 on a layer N=1, that is, the first layer network (step S54). The display control unit 74 adds 1 to N to obtain a layer N=layer N+1, i.e., layer 1+1=2 (step S55). The display control unit 74 then stores a value obtained by adding the head address and the number of points of use of the bridge station 11 described in the connection information 62 to the boundary address A[N(=2)] that is an address indicating the boundary between the network layers (step S56). In this case, it results in A[2]=0+10=10.

Since the display control unit 74 has not read items of information on all the communication devices described in the connection information 62, the display control unit 74 reads the item of information on the communication device indicated by L12 in the connection information 62 and determines whether or not the communication device indicated by L12 is a bridge station (step S53). Since the communication device indicated by L12 is the bridge station 12 (step S53: Yes), the display control unit 74 displays an icon of the bridge station 12 on a layer N=2, that is, the second layer network (step S54). The display control unit 74 adds 1 to N to obtain a layer N=layer N+1, i.e., layer 2+1=3 (step S55). The display control unit 74 then stores a value obtained by adding the head address and the number of points of use of the bridge station 12 described in the connection information 62 to the boundary address A[N (=3)] that is an address indicating the boundary between the network layers (step S56). In this case, it results in A[3]=2+6=8.

Since the display control unit 74 has not read items of information on all the communication devices described in the connection information 62, the display control unit 74 reads the item of information on the communication device indicated by L30 in the connection information 62 and determines whether or not the communication device indicated by L30 is a bridge station (step S53). Since the communication device indicated by L30 is the slave station 30 (step S53: No), the display control unit 74 next confirms whether or not the head address of the slave station 30 described in the connection information 62 is smaller than A[3] (step S57). Since the head address "4" of the slave station 30 is smaller than A[3]=8 (step S57: Yes), the display control unit 74 displays an icon of the slave station 30 on a layer N=3, that is, the third layer network (step S59).

Since the display control unit 74 has not read items of information on all the communication devices described in the connection information 62, the display control unit 74 reads the item of information on the communication device indicated by L31 in the connection information 62 and determines whether or not the communication device indicated by L31 is a bridge station (step S53). Since the communication device indicated by L31 is the slave station 31 (step S53: No), the display control unit 74 next confirms whether or not the head address of the slave station 31 described in the connection information 62 is smaller than A[3] (step S57). Since the head address "6" of the slave station 31 is smaller than A[3]=8 (step S57: Yes), the display control unit 74 displays an icon of the slave station 31 on a layer N=3, that is, the third layer network (step S59).

Since the display control unit 74 has not read items of information on all the communication devices described in the connection information 62, the display control unit 74 reads the item of information on the communication device indicated by L24 in the connection information 62 and determines whether or not the communication device indicated by L24 is a bridge station (step S53). Since the communication device indicated by L24 is the slave station 24 (step S53: No), the display control unit 74 next confirms whether or not the head address of the slave station 24 described in the connection information 62 is smaller than A[3] (step S57). Since the head address "8" of the slave station 24 is the same as A[3]=8 (step S57: No), the display control unit 74 subtracts 1 from a layer N to obtain a layer N=3−1=2 (step S58), and displays the icon of the slave station 24 on a layer N=2, that is, the second layer network (step S59).

Since the display control unit 74 has read items of information on all the communication devices described in the connection information 62, the display control unit 74 terminates the process. Through the above process, the display control unit 74 can display the network configuration of the communication system 100 illustrated in FIG. 15 on the display unit 75.

In the control system design support device 1, the display control unit 74 can display the network configuration illustrated in FIG. 15 further including the icons of the master station 2 and the slave station 21 by using the first layer network information 61 stored in the storage unit 73.

Next, the hardware configuration of the control system design support device 1 will be described. In the control system design support device 1, the communication unit 71 is realized by an interface circuit that communicates with the master station 2. The storage unit 73 is realized by a memory. The display unit 75 is realized by a monitor such as a liquid crystal display (LCD). The connection information acquisition unit 72 and the display control unit 74 are realized by a processing circuit. The processing circuit of the control system design support device 1 is also realized by the configuration illustrated in FIG. 8, as in the case of the bridge station 11 described above.

As described above, according to the present embodiment, the control system design support device 1 uses the connection information 62 acquired from the bridge station 11 to specify the network layer of each communication device from the arrangement of information part on communication devices described in the connection information 62. Consequently, the control system design support device 1 can distinguish between network layers to which the communication devices are connected, to display the network configuration of the communication system 100.

Fifth Embodiment

In the fourth embodiment, the control system design support device 1 displays the network configuration of the communication system 100, and more particularly displays bridge stations and slave stations. In the fifth embodiment, description is given for a case where the control system design support device 1 displays the network configuration of the communication system further including an extension device for extending the function of a bridge station. For example, an extension device is a device equipped with an input/output port for increasing the number of signal input/output ports in a bridge station, or the like. An extension device can be handled as a communication device similar to a slave station, but also can be specified as an extension device using the aforementioned device unique code.

Figure 18:
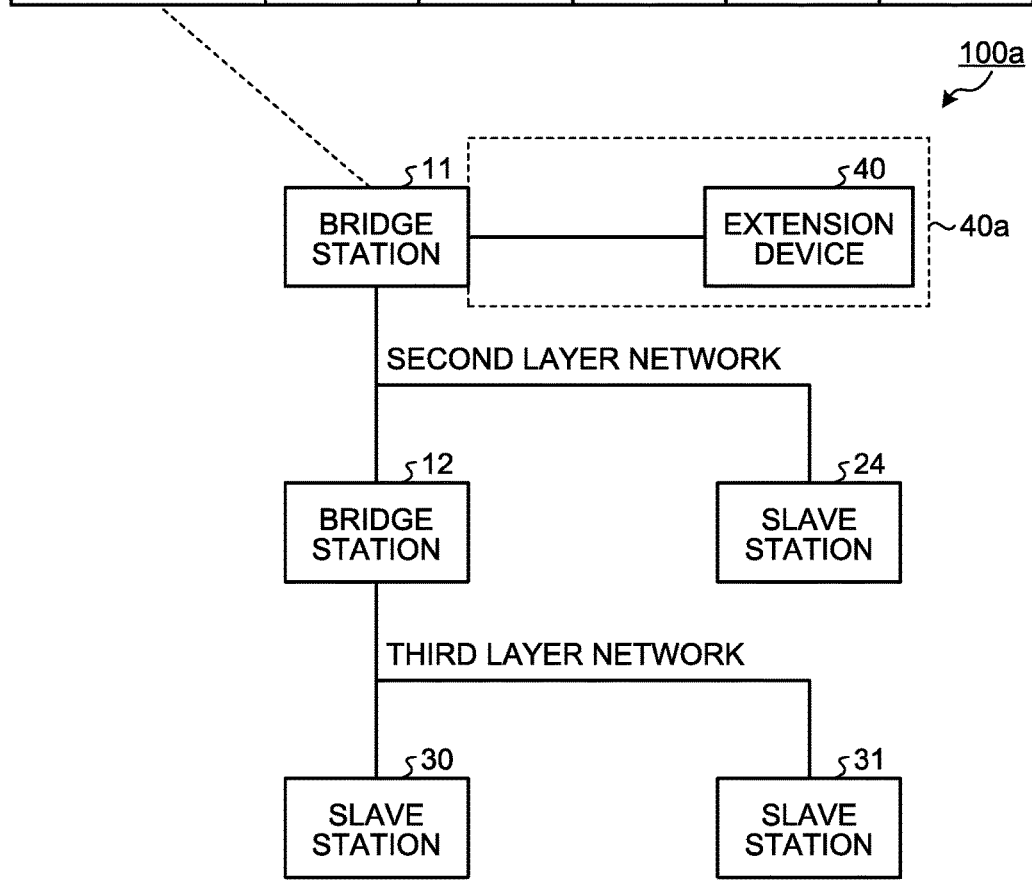
FIG. 18 is a diagram illustrating an example of network layers and communication devices to be displayed by a control system design support device according to a fifth embodiment.

FIG. 18 is a diagram illustrating an example of network layers and communication devices to be displayed by the control system design support device 1 according to the fifth embodiment. Based on the connection information 62a of the bridge station 11 acquired from the master station 2, the control system design support device 1 displays the connection relation among the bridge station 11, an extension device 40, and the communication devices that belong to the second layer network and the third layer network. The connection information 62a of the bridge station 11 includes information on a part for the extension device 40 indicated by L40 in addition to the connection information 62 of the bridge station 11 illustrated in FIG. 15. Therefore, the number of points of use of the bridge station 11 has been changed from 10 to 12.

In the display form illustrated in FIG. 18, the extension device 40 is connected to the bridge station 11 using a horizontal bar for the sake of distinguishing the extension device 40 from a slave station. Specifically, the display control unit 74 performs control to display a predefined communication device such as the extension device 40 in a display method different from that for other communication devices such as the bridge stations and the slave stations.

Figure 19:
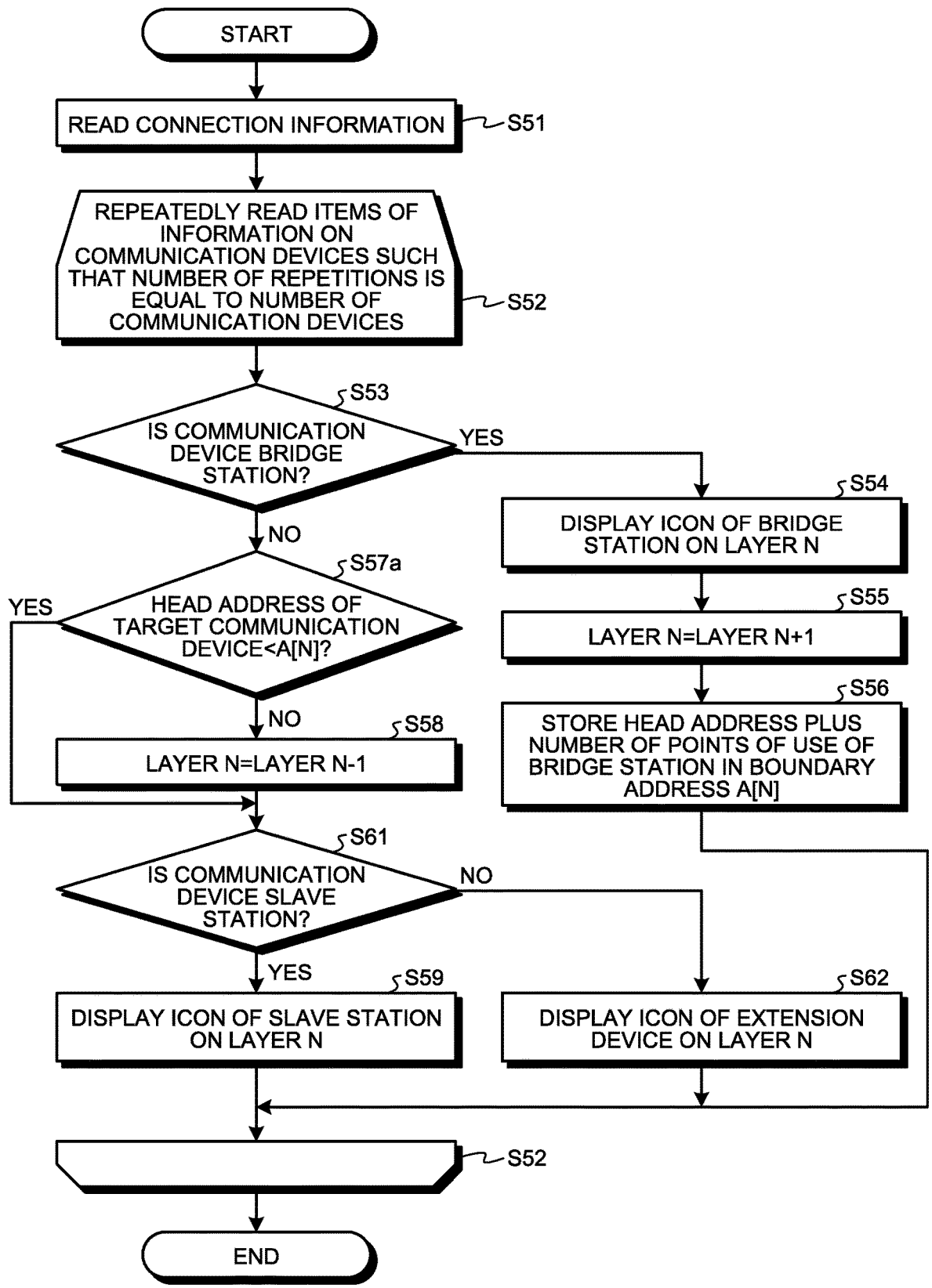
FIG. 19 is a flowchart illustrating the operation of the control system design support device system according to the fifth embodiment displaying the network configuration of a communication.

Next, the operation of the control system design support device 1 is described, in which the device 1 displays the network configuration of a communication system 100a. FIG. 19 is a flowchart illustrating the operation of the control system design support device 1 according to the fifth embodiment, in which the device 1 displays the network configuration of the communication system 100a.

The difference from the process of the fourth embodiment illustrated in the flowchart of FIG. 17 is that the step S57 is replaced by a step S57a, and a step S61 and a step S62 are added.

Step S57a has a written content obtained by changing the content of the step S57 in conformity to a case of any other device than the bridge stations and also a case of the extension device 40 besides the slave stations. However, the operation itself of the display control unit 74 is equivalent to that in the step S57.

In the fifth embodiment, after the process of step S57a: Yes or step S58, the display control unit 74 determines whether or not the communication device is a slave station (step S61). As described above, information indicated by a communication device in the connection information 62a is actually specified by a device unique code. Therefore, the display control unit 74 can determine whether or not the target communication device is a slave station, or whether the target communication device is a slave station or the extension device 40 by confirming the device unique code of each communication device. If the communication device is a slave station (step S61: Yes), the display control unit 74 advances the process to step S59, and then subsequent processes are in the same way as in the fourth embodiment. On the other hand, if the communication device is the extension device 40 (step S61: No), the display control unit 74 displays the icon of the extension device 40 using a horizontal bar connecting to the bridge station 11 although this situation is in a layer N=2, that is, the second layer network (step S62). By doing so, the display control unit 74 can display the network configuration of the communication system 100a illustrated in FIG. 18 on the display unit 75.

It is to be noted that the display control unit 74 may be configured to prepare an icon beforehand provided with a horizontal bar as an icon bitmap (BMP) for a device that essentially has to be additionally equipped in view of its specification as an extension device. In the example of FIG. 18, the extension device 40 with a horizontal bar is prepared as an icon 40a of the extension device 40. For a communication device such as the extension device 40 that is limited in respect to a manner of connecting to another communication device, the display control unit 74 employs data of an icon including a connection line to the bridge station, and performs displaying in units of icons each including a connection line when displaying the communication device such as the extension device 40 having the limited connection manner. Consequently, the display control unit 74 displays the icon beforehand having the horizontal bar when displaying the extension device, thereby making a drawing process for the horizontal bar unnecessary and making it possible to reduce a processing load. The extension instrument 40 is an example of a communication device having a limited manner of connecting to another communication device, and other types of communication devices may be employed.

As described above, according to the present embodiment, in a case where the communication system 100a includes the extension device 40 for extending a function of a bridge station, the device 40 being different from communication devices such as the master station 2, the bridge stations 11 and 12, and the slave stations 24, 30, and 31, the control system design support device 1 displays the extension device 40 in a displaying manner different from that for the master station 2, the bridge stations 11 and 12, and the slave stations 24, 30, and 31. Consequently, the control system design support device 1 can perform displaying for the user such that the user can easily recognize the network layer connected with the extension device 40.

The configuration described in the above-mentioned embodiments is an illustrative example of the contents of the present invention, and can be combined with other publicly known techniques and partially omitted and/or modified without departing from the scope of the present invention.

REFERENCE SIGNS LIST 1 control system design support device; 2 master station; 11 to 13 bridge station; 21 to 33 slave station; 40 extension device; 51 (n−1)-th layer communication unit; 52 n-th layer communication unit; 53, connection information acquisition unit; 54 connection information response unit; 55 relay unit; 56, 73 storage unit; 57 connection information generation unit; 61, 61a n-th layer network information; 62, 62a connection information; 71 communication unit; 74 display control unit; 75 display unit; 100, 100a communication system.

The invention claimed is:

1. A relay device connected to two networks of a plurality of hierarchized networks and connected to a first communication device directly under a first lower layer network that is on a lower level of the two networks, the relay device comprising
   a memory to store connection information including model identification information associated with each of a second communication device and the first communication device and information on a memory area assigned to each of the first communication device and the second communication device, the second communication device being connected to a lower side through a second lower layer network that is situated lower than the first lower layer network, the connection information being arranged in a format capable of specifying a network layer to which each communication device is connected; and
   a relay circuit that relays a communication signal via at least one of the two networks based on the connection information stored in the memory.

2. The relay device according to claim 1, wherein
   the model identification information is information capable of identifying the relay device and a slave station.

3. The relay device according to claim 1, wherein
the information on the memory area is information on a head address of the memory area and on a memory size indicating a size of the memory area.

4. The relay device according to claim 3, comprising:
connection information acquisition circuitry to, in a case where the first communication device is another relay device, acquire first connection information from the other relay device, the first connection information being connection information stored in the other relay device;
connection information generation circuitry to, in a case where second connection information that is the connection information storable in the memory is not stored and the memory stores, for the first communication device, network information including the model identification information, the head address, and the information on the memory size, generate the second connection information using the network information and the first connection information, and store the generated second connection information in the memory; and
connection information response circuitry to, in response to a request of reading the second connection information from a third communication device connected to an upper side through an upper layer network that is situated higher than the first lower layer network, transmit the second connection information stored in the memory to the third communication device, wherein
the connection information response circuitry instructs the connection information generation circuitry to generate the second connection information in a case where the second connection information is not stored in the memory, and
the connection information generation circuitry instructed by the connection information response circuitry instructs the connection information acquisition circuitry to acquire the first connection information.

5. The relay device according to claim 4, wherein
when generating the second connection information, the connection information generation circuitry determines, for the first communication device included in both the first connection information and the network information, whether the memory areas assigned are coincident with each other using the head address and the information on the memory size.

6. The relay device according to claim 5, comprising
relay circuitry to, in response to receiving a signal addressed to the head address, specify a communication device to which the signal is addressed or a relay device that relays the signal based on connection information or second connection information stored in the memory, and transmit the signal to the specified communication device or relay device.

7. The relay device according to claim 4, comprising
relay circuitry to, in response to receiving a signal addressed to the head address, specify a communication device to which the signal is addressed or a relay device that relays the signal based on connection information or second connection information stored in the memory, and transmit the signal to the specified communication device or relay device.

8. The relay device according to claim 3, comprising
relay circuitry to, in response to receiving a signal addressed to the head address, specify a communication device to which the signal is addressed or a relay device that relays the signal based on connection information or second connection information stored in the memory, and transmit the signal to the specified communication device or relay device.

9. A relay device connected to two networks of a plurality of hierarchized networks and connected to a first communication device directly under a first lower layer network that is on a lower level of the two networks, the relay device comprising
connection information acquisition circuitry to acquire, in a case where the first communication device is another relay device, from the other relay device, model identification information associated with each of a second communication device and the first communication device and information on a memory area assigned to the second communication device, the second communication device being connected to a lower side through a second lower layer network that is situated lower than the first lower layer network.

10. A display device connected to a master station that is a communication device constituting a communication system together with the relay device according to claim 1, the display device comprising:
connection information acquisition circuitry to acquire connection information via the master station from the relay device connected to the highest layer network; and
display control circuitry to specify the network layer of each communication device from arrangement of information on each communication device described in the connection information, and perform control to distinguish between layers of networks to which communication devices are connected and to display a network configuration of the communication system.

11. The display device according to claim 10, wherein
the display control circuitry performs control to display a predefined communication device in a displaying manner different from that for another communication device.

12. The display device according to claim 11, wherein
for a communication device that is limited in a manner of connecting to another communication device, the display control circuitry provides data of an icon including a connection line to the other communication device, and performs displaying in units of icons each including the connection line when displaying the communication device having the limited connecting manner.

13. A connection information transmission method for a relay device connected to two networks of a plurality of layered networks and connected to a first communication device directly under a first lower layer network that is on a lower level of the two networks,
the relay device comprising
a memory to store connection information including model identification information associated with each of a second communication device and the first communication device and information on the number of connected second communication devices or on a memory area assigned to each of the first communication device and the second communication device, the second communication device being connected to a lower side through a second lower layer network that is situated lower than the first lower layer network, the connection information being arranged in a format capable of specifying a network layer to which each communication device is connected, the method comprising:

an acquisition step of connection information acquisition circuitry, in a case where the first communication device is another relay device, acquiring first connection information from the other relay device, the first connection information being connection information stored in the other relay device;

a generation step of connection information generation circuitry, in a case where second connection information that is the connection information storable in the memory is not stored in the memory and the memory stores, for the first communication device, network information including the model identification information and the information on the memory area, generating the second connection information using the network information and the first connection information, and storing the generated second connection information in the memory; and a response step of connection information response circuitry, in response to a request of reading the second connection information from a third communication device connected to an upper side through an upper layer network that is situated higher than the second lower layer network, transmitting the second connection information stored in the memory to the third communication device.

14. A network configuration display method comprising:

an acquisition step of connection information acquisition circuitry acquiring, via a master station that is a communication device, second connection information from a relay device connected to a highest network layer in a communication system including a plurality of hierarchized network layers; and a display step of display control circuitry specifying the network layer in the plurality of hierarchized network layers of each communication device from arrangement of information on each communication device described in the second connection information, and performing control to distinguish between layers of networks in the plurality of hierarchized network layers to which communication devices are connected and to display a network configuration of the communication system including the relay device and the master station.

* * * * *